(12) United States Patent (10) Patent No.: US 9,799,064 B2
Ohnemus et al. (45) Date of Patent: Oct. 24, 2017

(54) GARMENT FITTING SYSTEM AND METHOD

(71) Applicant: Isabelle Ohnemus, Kuesnacht (CH)

(72) Inventors: Isabelle Ohnemus, Kuesnacht (CH); Joel J. Felber, Norwalk, CT (US)

(73) Assignee: EYEFITU AG, Herrliberg (CH)

( * ) Notice: Subject to any disclaimer, the term of this patent is extended or adjusted under 35 U.S.C. 154(b) by 0 days.

(21) Appl. No.: 13/959,462

(22) Filed: Aug. 5, 2013

(65) Prior Publication Data

US 2014/0040041 A1 Feb. 6, 2014

Related U.S. Application Data

(60) Provisional application No. 61/844,241, filed on Jul. 9, 2013, provisional application No. 61/820,230, filed on May 7, 2013, provisional application No. 61/812,900, filed on Apr. 17, 2013, provisional application No. 61/803,722, filed on Mar. 20, 2013, provisional application No. 61/679,537, filed on Aug. 3, 2012.

(51) Int. Cl.
*G06Q 30/00* (2012.01)
*G06Q 30/06* (2012.01)
*G06Q 30/02* (2012.01)

(52) U.S. Cl.
CPC ..... *G06Q 30/0627* (2013.01); *G06Q 30/0222* (2013.01); *G06Q 30/0601* (2013.01); *G06Q 30/0631* (2013.01); *G06Q 30/0643* (2013.01)

(58) Field of Classification Search
CPC .................................. G06Q 30/0601–30/0645
USPC ................................................ 705/26.1–27.2
See application file for complete search history.

(56) References Cited

U.S. PATENT DOCUMENTS

| | | |
|---|---|---|
| 3,391,392 A | 7/1968 | Doyle |
| 4,149,246 A | 4/1979 | Goldman |
| 5,515,268 A | 5/1996 | Yoda |
| 5,930,769 A | 7/1999 | Rose |
| 6,246,994 B1 | 6/2001 | Wolven |
| 6,266,649 B1 | 7/2001 | Linden |
| 7,089,152 B2 | 8/2006 | Oda |
| 7,194,327 B2 | 3/2007 | Lam |

(Continued)

FOREIGN PATENT DOCUMENTS

GB 2458388 9/2009

OTHER PUBLICATIONS

Melero, A. (2012). Marketing firm puts a spin on virtual dressing room: Digital: Motion control device powers swivel to give a 3D image of a shopper. San Fernando Valley Business Journal, 17(3), 10(1). Retrieved from https://dialog.proquest.com/professional/professional/docview/925695867?accountid=142257.*

(Continued)

*Primary Examiner* — Resha Desai
(74) *Attorney, Agent, or Firm* — Leason Ellis LLP

(57) ABSTRACT

At least one database is accessed that includes at least personal size information representing measurements respectively associated with at least one person. Clothing information is received that represents at least one of the plurality of articles of clothing. The received clothing information is processed to associate the clothing information with at least some of the personal size information associated with one of the plurality of persons. Thereafter, a value is determined, as a function of the processed clothing information, that represents the fit of the one of the articles of clothing with at least one person. Information associated with the information is displayed.

25 Claims, 23 Drawing Sheets

(56) References Cited

U.S. PATENT DOCUMENTS

| | | |
|---|---|---|
| 7,310,883 B1 | 12/2007 | Park |
| 7,398,133 B2* | 7/2008 | Wannier et al. ............. 700/132 |
| 7,421,306 B2* | 9/2008 | Adiseshan .................. 700/130 |
| 8,095,426 B2 | 1/2012 | Adelman |
| 2002/0138170 A1* | 9/2002 | Onyshkevych et al. ...... 700/130 |
| 2006/0059054 A1* | 3/2006 | Adiseshan ..................... 705/26 |
| 2006/0080182 A1 | 4/2006 | Thompson |
| 2007/0063050 A1* | 3/2007 | Attia ................ G06F 17/30879 235/462.46 |
| 2010/0030578 A1* | 2/2010 | Siddique et al. ................. 705/3 |
| 2011/0055054 A1* | 3/2011 | Glasson ....................... 705/27.2 |
| 2011/0082764 A1 | 4/2011 | Flusser et al. |
| 2011/0099122 A1* | 4/2011 | Bright et al. ................. 705/348 |
| 2011/0184832 A1 | 7/2011 | Wannier et al. |
| 2011/0231278 A1* | 9/2011 | Fries ............................ 705/26.5 |
| 2012/0030060 A1* | 2/2012 | Lu et al. ...................... 705/26.7 |
| 2012/0127199 A1 | 5/2012 | Aarabi |
| 2012/0316985 A1* | 12/2012 | Wilkinson .............. A41H 1/00 705/26.7 |

OTHER PUBLICATIONS

Rankin, Peter. "Virtual Fitting Room Case Study." *Fits.me*. Web. www.fits.me.

Rankin, Peter. "Overcoming the Fit Problem to Deliver Increased Sales and Reduced Garment Returns for Online Clothing Retailers." *Fits.me*. Web. www.fits.me.

Rankin, Peter. "Garment Returns and Apparel Ecommerce: Avoidable Causes, The Impact on Business and the Simple Solution." White Paper, *Fits.me*. Web. www.fits.me.

* cited by examiner

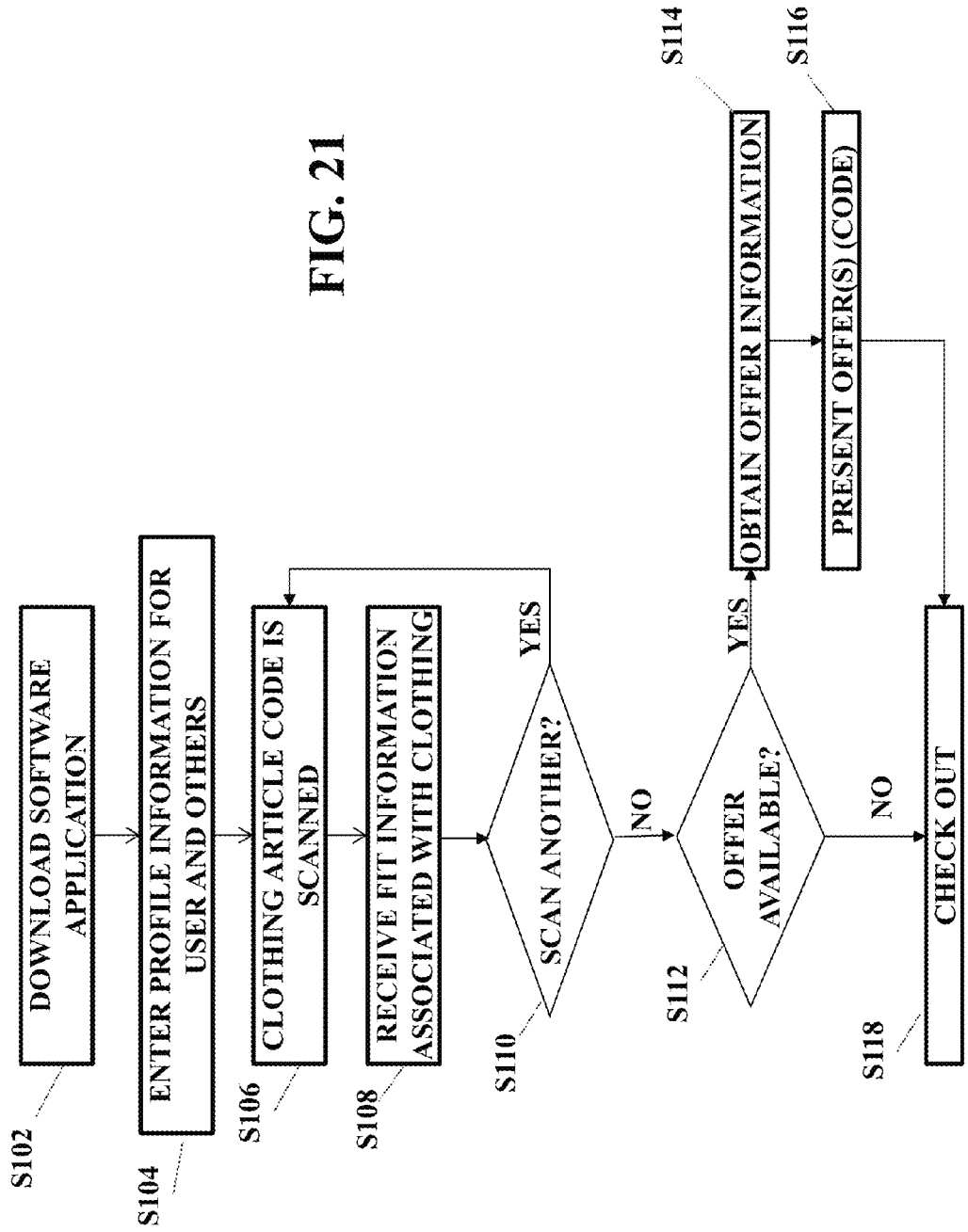

GARMENT FITTING SYSTEM AND METHOD

CROSS-REFERENCE TO RELATED APPLICATION

The present application relates to U.S. Provisional Patent Application Ser. No. 61/844,241, filed Jul. 9, 2013, U.S. Provisional Patent Application Ser. No. 61/812,900, filed Apr. 17, 2013, U.S. Provisional Patent Application Ser. No. 61/679,537, filed on Aug. 3, 2012, U.S. Provisional Patent Application Ser. No. 61/803,722, filed on Mar. 20, 2013, and also to U.S. Provisional Patent Application Ser. No. 61/820,230, filed on May 7, 2013, all of which are hereby incorporated by reference in their respective entireties.

FIELD

The present application relates, generally, to networking and, more particularly, to a networked system and method for ensuring uniformity in clothing standards and for proper fitting of clothing.

BACKGROUND

The increasing internationalization of the fashion industry and consumers' shopping behavior, as well as the rise of online businesses, has resulted in shortcomings for consumers who shop for clothes. These shortcomings are becoming increasingly more pressing.

For one example, there are numerous standards and methods for describing the size of an article of clothing domestically and internationally. These standards (and methods for determining the standards) also vary between clothing types, manufacturers and brand owners. Staying informed and having access to the relevant information when it matters most, e.g., while shopping, poses a significant and burdensome challenge to consumers.

Finding a piece of clothing that fits well can be very cumbersome for consumers, due to various reasons. They may not be aware of their own clothing size, find sizing systems unintuitive (for example, a German size 98 is the equivalent of a German size 50 but cut for slim people) or are confused by the same printed size information on various items that may differ between specific countries and brands. Moreover, there are derived clothing sizes, such as "slim fit" for shirts, which may be a further source of confusion for consumers.

Furthermore, typical clothing sizes represent a tremendous over-simplification. Various clothing sizes are reduced to one or two standardized measurements, despite the complex shape of human bodies. As a result, knowing that a piece of clothing is, for example, of size M, does not often result in a proper or preferred fit.

A significant problem with purchasing clothing, particularly on-line over the Internet, is due to an extremely high rate of returned clothes. This may be caused by the difficulty that consumers face when trying to determine whether clothing fits, in part due to consumers making measurement errors when trying to determine their respective body sizes. Personal measurement errors occur even in those cases when an Internet-based clothing shop provides information to guide consumers how to determine suitable clothing sizes. Moreover, clothing sizes are often not properly represented which adds to consumer confusion and returns.

SUMMARY

A system and method are disclosed for representing fitting of clothing for a plurality of users. At least one database is accessed that includes at least personal size information representing measurements respectively associated with at least one person. Clothing information is received that represents at least one of the plurality of articles of clothing. The received clothing information is processed to associate the clothing information with at least some of the personal size information associated with one of the plurality of persons. Thereafter, a value is determined, as a function of the processed clothing information that represents the fit of the one of the articles of clothing with at least one person. Information associated with the information is displayed.

These and other aspects, features, and advantages of the invention can be understood with reference to the following detailed description of certain embodiments of the invention taken together in conjunction with the accompanying drawing figures.

BRIEF DESCRIPTION OF THE DRAWINGS

FIG. 21 is flowchart that illustrates steps associated with an implementation of the present application.

DESCRIPTION

Figure 1:
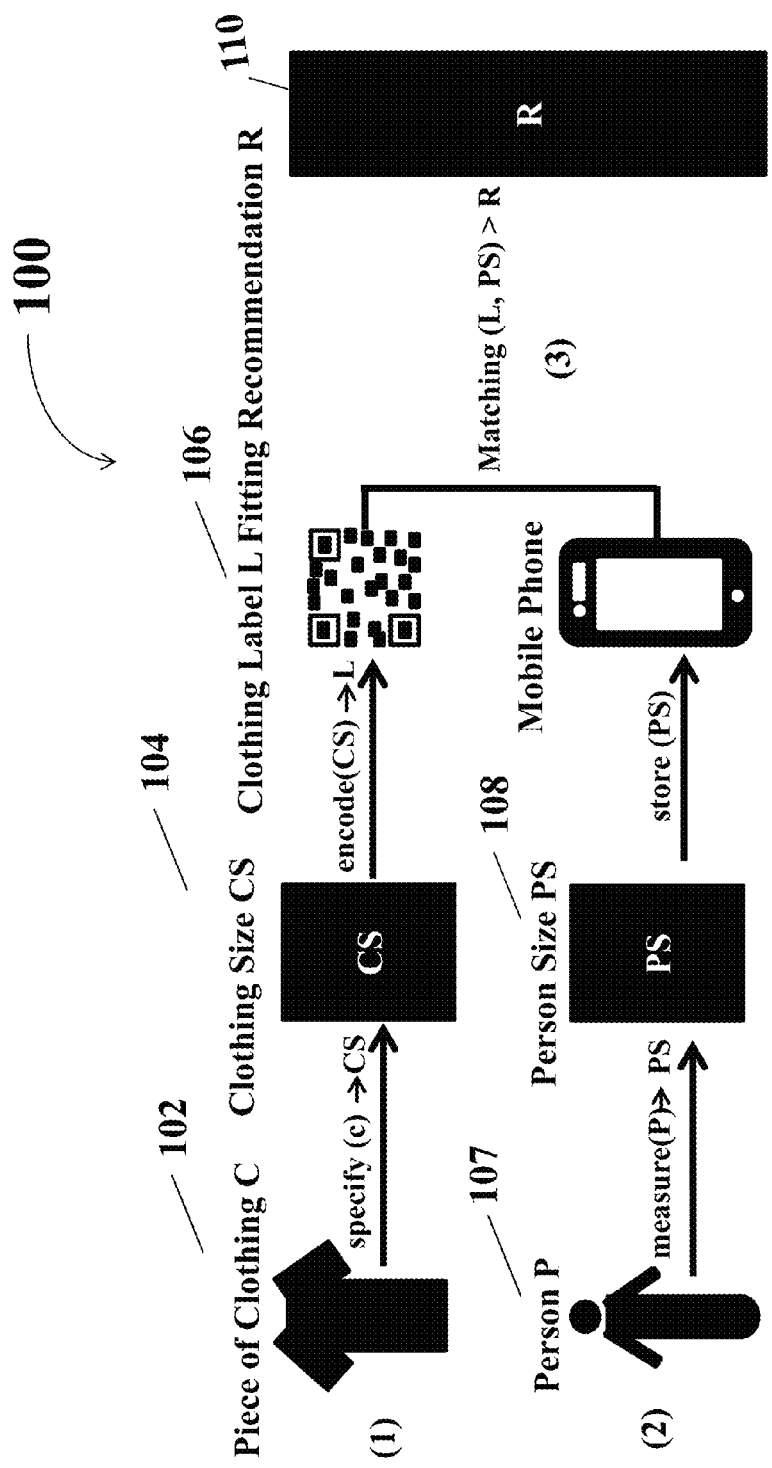
FIG. 1 illustrates features and process steps associated with one or more implementations of the present application and in connection with a provider of clothing and a consumer.

In one or more implementations, the present application provides a system and method for ensuring proper fitting of clothing. In an aspect of the present application, a software application is provided for configuring a computing device to implement many of the features shown and described herein. When used in brick-and-mortar stores, the software application enables consumers to scan a bar code that may be attached to an article of clothing to determine if and/or how well clothing will fit, without a need to try the clothing on.

In one or more implementations, the present application supports a one-scan fitting process. For example, relevant measurements of pieces of clothing may be stored directly in a quick response (QR) code or other machine readable code that is provided with an article of clothing or otherwise attached thereto. In such implementation(s), customers do not need network bandwidth to obtain size information. Such implementation may result in significant cost savings, such as attributed to roaming fees, overtime minutes, download storage (e.g. megabytes) or the like. Moreover, retailers may not need to provide Wi-Fi connectivity for their customers which results in cost savings for retailers.

In one or more alternative implementations, a QR code is scanned by a computing device, and the code includes links to direct the user to a website or other resource. This provides an opportunity to provide services and information remotely to users scanning a code, regardless of the respective device and/or software application that is being operated. Once directed to the particular website, a link may be provided for the user to download and install a software application, such as described above, for implementing features shown and described herein.

A person's body measurements may be stored locally in the user's smartphone or other suitable mobile device, or may otherwise be accessible on a remote device. A user may determine whether an article of clothing fits by using a mobile computing device, such as a smartphone or other mobile device, to scan a code (e.g., a barcode) that is coupled or associated with the article. In connection with such implementation(s), the information stored in or otherwise accessed by the mobile computing device provides for accurate fitting analysis. Even in various countries and/or in places where no online data-connection (i.e., no bandwidth) may be available, the information needed to perform many of the features shown and described herein may be available by being stored "locally" in the mobile computing device and/or the barcode. Whether displaying virtual bar codes on a computing device display screen, or by physically providing a code with an article of clothing (e.g., in a brick-and-mortar store), adoption of the present application in an on-line and off-line context is relatively convenient and inexpensive. In both brick-and-mortar and e-commerce shopping environments, users simply check whether an article fits by scanning a QR (or other) code with their smartphones or other suitable mobile devices.

In one or more implementations, physical clothing measurements are obtained directly from merchants, including clothing manufacturers, distributors, designers or the like, who may submit such data during or shortly after the manufacturing process. Alternatively, information may be obtained manually and/or substantially automatically from publicly accessible sources, such as Internet web sites, mobile device software applications or other resource made available by clothing manufacturers, distributors, designers or the like. The present application provides a seamless and low-cost solution, with very little additional effort required from clothing manufacturers, distributors, designers or the like who may partner with a proprietor of the present application and, for example, may share in proceeds earned thereby.

In one or more implementations, physical measurements are received directly from merchants (e.g., manufacturers), such as via one or more application programming interfaces (APIs), user interfaces or other suitable way (e.g., electronic data interchange), and the measurement information is stored in a machine-readable (e.g., QR) code. Alternatively, the present application provides a conversion service that substantially automatically converts values received from one or more merchants (e.g., manufacturers) to an independent and potentially worldwide consistent standard.

Examples of clothing and size information that one or more manufacturers may provide include, for example, neck size, chest size, midsection, waist size, arm length, and inner leg length. Particular measurement information respectively associated with one or more of these categories may further be identified in connection with clothing sizes offered by the manufacturer(s). For example, a pair of pants identified as "31/30" may have a waist circumference of 79 cm and a leg length of 78 cm, and there may not be a direct proportion of inches to centimeters. Correlating specific measurement information with a particular size of clothing (e.g., 31/30), ensures improved accuracy in connection with a proper fit, as well as for providing recommendations to users, such as for one or more alternative sizes, styles or manufacturers. Additional details regarding features of the present application to provide recommendations is set forth below.

Referring now to the drawings, in which like reference numerals are represent like elements, FIG. 1 illustrates features and process steps 100 associated with one or more implementations of the present application and in connection with a provider of clothing and a consumer. The dimensions of a piece of clothing 102 are preferably measured in a precise way, resulting in clothing size (CS) information 104 that may describe the shape of a piece of clothing. The CS information 104 may then be encoded in a machine-readable format, such as in a QR code, and physically attached to the piece of clothing on a label (L) 106, e.g., by printing it on a label or other suitable medium. In addition, a person (P) 107 submits body size measurements and style preferences, which are shown as person size (PS) information 108, that represent a person's body shape and style preferences with particular and precise detail. In one implementation, the PS information 108 is stored locally, such as on the person's smartphone or other suitable mobile computing device. In an alternative implementation, PS information 108 is stored remotely, such as on a server device accessible via a network connection. In one or more implementations, the present application provides a secure interface that preserves a person's privacy with regard to PS information 108. It is possible, for example, that a person would not want his or her PS information 108 broadcast over the Internet or otherwise made available for public access. By storing PS information 108 locally, such as on a smartphone, the present application may provide clothing fitting analysis and recommendations without knowing who the particular individual is. There may be, for example, only an anonymous identifier representing an individual that is passed between devices and that is used to represent an individual. In this way, a person's privacy is protected and preserved by the present application.

Continuing with reference to FIG. 1, by encoding CS information 104 in machine-readable form and coupling that information with an article of clothing, the present application provides a significant convenience over known systems. For example, if person P 107 is shopping in a traditional brick-and-mortar store, (s)he can scan simply a QR code present on the label of an article of clothing with an application on his or her smartphone or other suitable mobile computing device and, as a result, can determine substantially immediately whether the clothing fits and/or complies with the person's style preferences. In one or more implementations, various kinds of graphical information may be provided, such as a diagram of a body-shape highlighting specific one or more areas where the clothing may or may not fit particularly well.

Continuing with reference to FIG. 1, fitting information and recommendations (R) 110 are presented to the user and may be provided via a matching algorithm implemented in an application on the user's smartphone or other mobile computing device. Recommendations may be provided in a plurality of contexts including, for example, for alternative brands, styles, sizes and even wearers. By leveraging one or more databases of CS information 108, recommendations may be made for users to try different manufacturers or brands, or recommendations to try alternate sizes. Moreover, a user may scan an item and be automatically presented with a recommendation of a size that is determined to be a suitable fit. The matching algorithm may use both the CS information 104 and PS information 108 as input. By storing the CS information 104 locally in a clothing label (instead of, for example, providing a link to online information) and storing the PS information 108 directly on the consumer's smartphone or other suitable mobile computing device, a user may use the features shown and described herein without a requirement of an online connection or network access.

In one or more implementations, CS information 104 is provided from catalogs of various clothing manufacturers and/or distributors. For example, a company selling clothes releases a catalog of fall clothing that includes size information for each of the articles of clothing included in the catalog. The information provided in the catalog is, thereafter, entered as CS information 108 for providing functionality shown and described herein.

Also in one or more implementations, CS information 104 may be provided in a form from one or more of a plurality of people who submit clothing measurement information, for example, in exchange for a discount or other offer for clothes or other items. In this way, a form of crowd sourcing is supported, wherein people scan clothing, physically measure clothing, submit information regarding how their own clothing fits, or perform some other activity that results in acquisition of CS information 104. The information may be automatically uploaded, such as via an application programming interface, via a user interface or simply emailed or provided via SMS text. In such latter cases, one or more people may transcribe the information from the email or text into one or more databases. Alternatively, information from email and/or text may be substantially automatically entered into one or more databases. Such crowd sourcing may be particularly useful in instances where information provided on garment labels (e.g., SKU number or other number) is very terse and not including measurements. Individuals may, therefore, supply information regarding clothing measurements that would otherwise be missing, such as from clothing tags and/or barcodes.

In an example implementation, PS information 108 may contain a set of values P1 ... Pn that represent a person's body shape and size. One option for these n values are, for example, the following non-limiting set of measurements: Height; Bust; Waist; Hip; Shoulder Width; Shoulder to Bust; Shoulder to Waist; Inner Leg Length; Outer Leg Length; Sleeve Length; Arm Length; Neck; Biceps; Thigh; Feet; Leg calf; Hands; and Head. In addition to particular body measurements, other information may be stored, such as a person's preferences about the fit of clothing (tight-fit or relaxed fit).

In one or more implementations, PS information 108 includes garments that users already own and that fit them well. Alternatively or in addition, the present application may calculate body dimensions based on other users whom the selected garments also fit and for whom body measurements may have been stored. Another option includes the visual measurement of the approximate body shape and dimensions using either web-cams or users' mobile phones. In order to be able to perform the fitting, measurements of the clothes may be acquired in one or more of various ways. For example, some brands provide tables for conversion between clothing sizes and body measurements. This information may be already sufficient for at least some of the features shown and described herein. If available, the present application may also benefit from more and more precise measurements, as they may be available directly from designers or manufacturers. Notwithstanding the data source, the present application supports acquiring and processing measurements of various garments.

The CS information 104 may contain a set of values C1 ... Cn that represent the size and shape of a piece of clothing with particularity. In one or more implementations, specific attributes correspond to and are matched with the information representing the person's size information.

One possible variant for the CS information 104 is to specify the range of PS information 108 for which a particular piece of clothing will fit a person well. This approach has several advantages. The final CS information 104 can implicitly store not only information about the physical shape of the piece of clothing, but also information about how the designer intended the piece of clothing to fit. Furthermore, a matching algorithm may be implemented in a straight-forward way that requires virtually no distinction between different categories of clothing or specific domain knowledge. The matching algorithm may determine whether a piece of clothing fits a specific person well, as a function of variables, including to incorporate additional information directed to one or more clothing categories.

In one or more implementations, the CS information 104 may include the relevant physical dimensions of a piece of clothing as a function of a specific clothing category, such as for uniformity and standardization. For example, a category of sweatshirts may include information regarding the clothing's neck size, chest size, waist size, and hip size, as well as sleeve length. This approach has an advantage of measuring the CS information 104 for well-defined clothing categories, and providing particular values for many pieces.

The present application supports providing CS information 104 in a machine-readable form in various ways. For example, optical 1D barcodes; optical 2D codes; optical character recognition (OCR); radio frequency identification (RFID) and near field communication (NFC) technology may be suitable as carriers for CS information 104. 2D barcodes are useful for incorporating sufficient amount of data to store the CS parameters, and are readable by many camera-phones on the market today. Moreover, optical codes such as QR codes are recognizable on screens, enabling users to interact with the tag in an online context.

In one or more implementations, a clothing article's EAN or UPC code may also be included in the label or other tag. This provides the application not only with size information, but also other information regarding the particular clothing article that the user scanned. This information is usable as a basis for services, such as for providing users with recommendations about similar clothing articles or presenting them with ratings that others provided about the same article. In case the EAN or UPC code is not directly included, users may perform a second scan of the item's bar code.

As noted herein, data encoded in the label or other tag may include the CS information 104 directly. Links to further information may be included (e.g., the URL of a websites), by encoding CS information 104 directly in label or other tag ensures that consumers can use the service in situations in which no online access is available. In this way, customers who have no data plans or otherwise have no access to network bandwidth (e.g., in certain stores or locations) are still able to obtain CS information 104. Alternatively, the system may provide the user to order the clothes immediately and have the clothing shipped home or to another location.

In one or more implementations, the input of the matching algorithm includes the CS information 104, such as extracted from a label attached to an article of clothing. Additionally, input may include PS information 108 that is, for example, stored on a consumer's smartphone or other suitable mobile computing device. Other input information may include a user's personal fitting preferences (for example, if she prefers a tighter or a more relaxed fit), as well as a particular fit as recommended by the designer or merchant. Moreover, although many of the examples shown and described herein relate to a machine readable code used for storing CS information 104, one or more machine readable codes may be suitable in one or more implementations to store PS information 108, as well. For example, after PS information 108 is obtained a machine-readable code, such as a 2D code, may be generated or otherwise provided for scanning. Such 2D code representing PS information 108 may be displayed on a mobile computing device, or may be printed and carried with a consumer, such as on a card or other convenient form.

Figure 2:
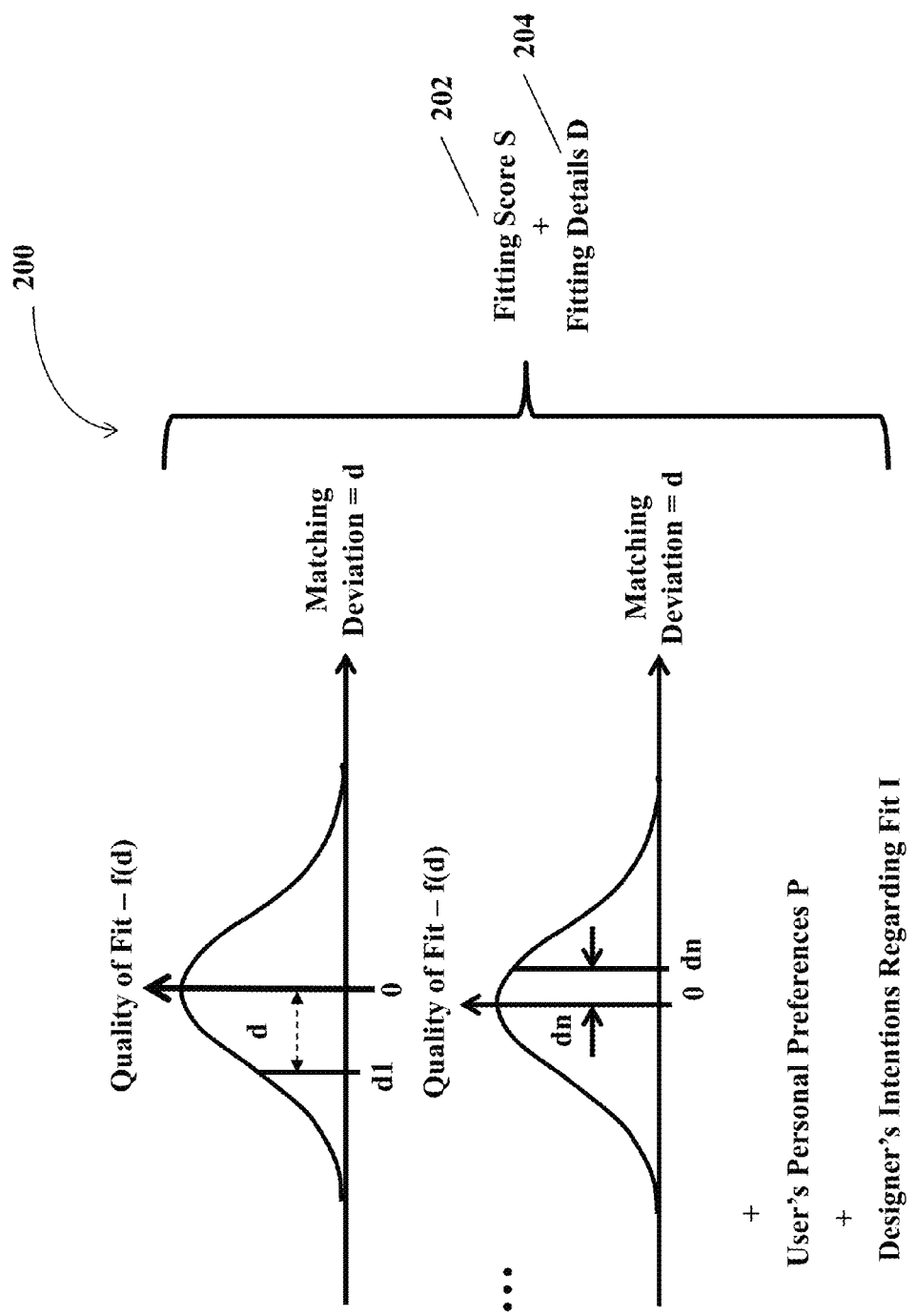
FIG. 2 illustrates an example mode of operation of the matching algorithm in accordance with an implementation of the present application.

FIG. 2 illustrates an example mode of operation of the matching algorithm 200 in accordance with an implementation. For each of a plurality of specific articles of clothing C 102, such as various pairs of trousers, the relevant CS information 104 and PS information 108 may be compared. For each n pairs of relevant (Ci, Pj) values, a matching deviation value Dx may be derived, which represents how well the pieces of clothing fit with regard to the specific person P. Generally, the smaller the absolute values of Dx, the better or more suitable the overall fit of the piece of clothing. Moreover, the matching algorithm may combine all relevant matching deviation values D1 . . . Dn with information about the person's P's 107 preferences and the designer's fitting suggestions (1) 202, and generates a single fitting score value (S) 204. This value describes how well the piece of clothing C 102 fits the person P107. In addition to fitting score value 5, the information D1 . . . Dn, P107, and I 202 may be used to derive detailed information about the fit. For example, information may be provided that the trouser fits well in terms of length, but is too tight around the upper thighs.

Figure 3:
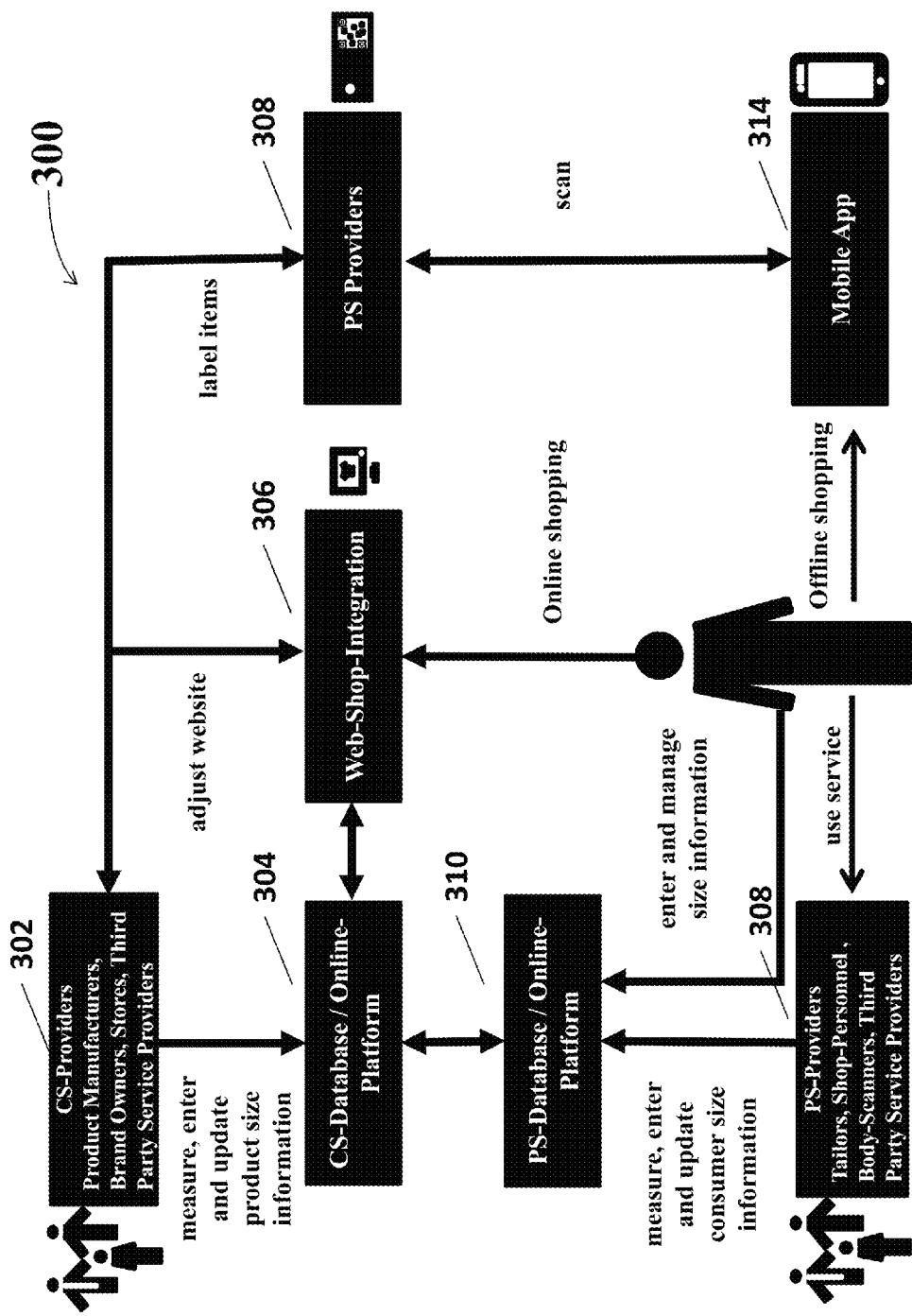
FIG. 3 illustrates components associated with an example implementation and includes a flow of information associated with the interconnections thereof.

FIG. 3 illustrates components 300 associated with an example implementation and includes a flow of information associated with the interconnections thereof. Clothing that is represented in connection with the teachings herein may be measured to provide CS information 104, which may, thereafter, be attached to a product's label or other suitable tag. Alternatively, manufacturers, distributors, designers or the like may submit CS information 104 electronically. In yet another alternative, a brick-and-mortar store may measure and label clothing articles to provide CS information 104 for its customers. Moreover, the present application may include a service for size conversion that allows users to convert known sizing information relatively easy way to approximate CS information 104. This service may reduce the amount of future efforts when migrating to provide options and services substantially are shown and described herein.

Continuing with reference to FIG. 3, a CS-Provider 302 may provide a CS database/on-line platform 304 for data management. This component provides an online presence and database, in which clothing size data generated by different CS-providers 302 may be stored and managed. For example, web-site integration 306 may be provided for e-commerce web sites to integrate services. CS database/on-line platform 304 provides a convenient way for CS information 104 to be retrieved. CS-providers 302 may check whether a specific piece of clothing had been measured previously in the supply chain, and therefore avoid doing the same work twice. Furthermore, in cases in which no CS information 104 is obtained or known for clothing, approximate CS information 104 may be generated automatically based on, for example, traditional sizing information and/or a known product brand and style.

Moreover, PS-providers 308 may provide CS information 104, for example, in a PS database/online platform 310. PS-providers 308 may include tailors and third-party service providers, such as providing body scanning technology, for obtaining and/or transmitting CS information 104. PS-providers 308 or consumers themselves may use a PS database/online platform 310 to enter or update CS information 104. In one or more implementations, before a consumer uses a system and method in accordance with the present application and in order to check whether a piece of clothing fits, the customer's PS information 108 is preferably provided. Customers may obtain and submit PS information 108 themselves, such as by following a brief instruction manual. In addition or in the alternative, tailors, selected brick-and-mortar stores, and other third party service providers main provide this service for consumers, referred to herein, generally, as CS-providers 308.

As noted herein, a benefit of the present application regards no or little need for additional infrastructure (customers bring their own smartphones and clothing labels already in place are leveraged). A fitting algorithm is implemented in accordance with one or more implementations, and that is applied to compute whether and how well a given piece of clothing will fit a specific person. In one or more embodiments, measurements of a piece of clothing are represented and physical body measurements associated with an artificial person are represented to fit correctly to the body measurements of the test person. In this way, the fitting algorithm produces meaningful results, even in the presence of incomplete or less precise data. Furthermore, continuous improvements on the fitting algorithm based on user feedback are supported.

Figure 4:
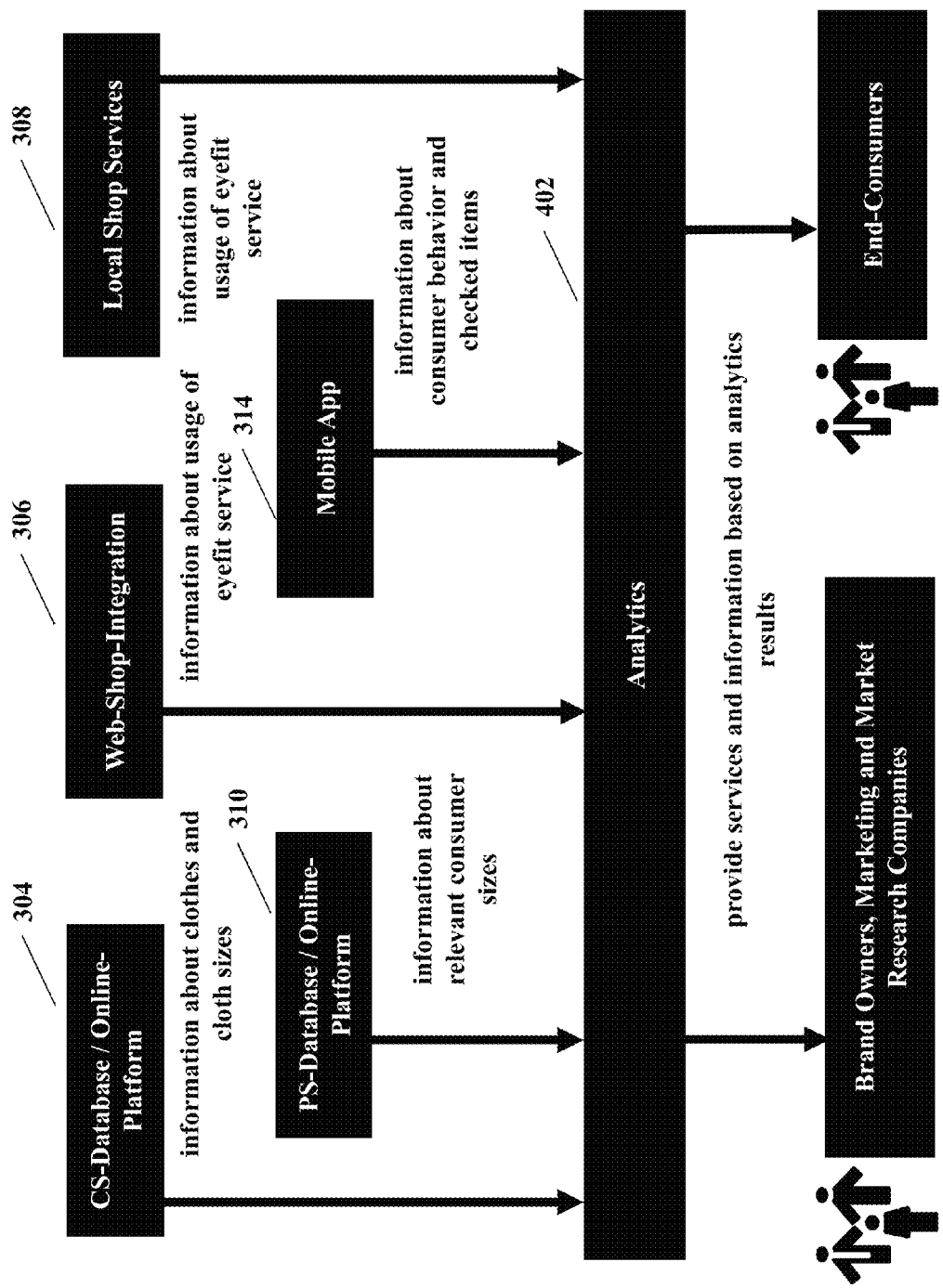
FIG. 4 illustrates an analytics module that interfaces with various other system components.

In accordance with one or more implementations of the present application, various system components provide a service and/or generate data in connection therewith. Much of the data collected, aggregated and analyzed is done so as a function of an analytics module. FIG. 4 illustrates an analytics module 402 that interfaces with various other system components. Examples of data include but are not limited to: detailed information about which clothes and sizes are sold and are in demand; near real-time information about consumers' shapes and sizes; and information representing how often the service is used, as well as where and in what context the service used.

These data are applicable, for example, not only for online activity in the context of e-commerce, but also for a physical context, such as employing GPS or the like. By leveraging device functionality, such as GPS, WLAN access points, BLUETOOTH beacons, or the like, users' locations may be detected. The present application combines this information with location information for shops (e.g., such as available mapping technology) and assists to determine which shop a user is in, as well as nearby surrounding shops.

In contrast to traditional means of obtaining such data, for example, via surveys or nationwide measuring campaigns, the present application provides data that are current (as opposed to archived clothing measurements that may be out-of-date), cost-effective (as opposed to costly surveys and campaigns), and in an unprecedented quality and granularity (e.g., each piece of information can be tracked back to the individual consumer and shopping event). Such data are useful to improve and provide (including to monetize) services relevant for specific target groups. For example, detailed information about which clothing sizes are in demand to provide manufacturers and brand owners with a new opportunity to save on production costs. Further, information is reliable and up-to-date regarding consumers' sizes, which is valuable for various industries and even governmental agencies. In addition, information about consumers' shopping behavior and interests is valuable for brands, shop owners, as well as the marketing industry. Data representing service usage by customers may also be used as a base for royalty-based business models (e.g. for online shops, which are enabled by the present application to reduce the number of returns due to clothes that do not fit well and, accordingly, to reduce associated costs).

In addition to PS information 108 and CS information 104 received and stored, as described herein, the present application supports receiving and storing other data related to people and clothing. For example, images of a person, clothing preferences such as preferred brands, friends, and other data may be received and stored in one or more database. For a specific piece of clothing, such additional data may comprise links to similar pieces of clothing or fitting accessories, ratings by users, or product images. Moreover, information may be accessed on-line (e.g., via the Internet) and associated with an article of clothing, and may include, for example, product images or product ratings. Moreover, the present application is extendable via various location-based services. For example, users may use a mobile computing device software application ("Mobile App" 314, FIG. 3), such as shown and described herein, to check-in at local brick-and-mortar stores, either manually or automatically. Local shopping information, such as special discounts, may be provided also via the application. Moreover, if an article of clothing is not available in the user's perfect size, the application may suggest the nearest store where the just scanned piece of clothing is still available in the user's size.

Furthermore, the gap between the online and offline shopping world is effectively bridged by the present application. Users may "browse" for clothing articles online, and when they locate an interesting piece, the application may identify nearby stores that are selling the item, thereby providing them with an opportunity to physically interact with the item.

Moreover, based on users' preferences that are stored in one or more databases as well as data linked to clothing, the present application may operate to present recommendations to users. Such recommendations may include information about specific articles of clothing or fashion brands that may suit the user. Other recommendations may include accessory items and/or additional clothing that match or fit well to clothes that a user already owns. Other forms of recommendations may originate from other persons who wear similar or the same clothing styles as a user.

The present application supports integration in the fashion industry information technology ("IT") production systems. Current software systems that are in use in the fashion industry's supply chain contain and manage various product related style, size, and cloth data. These data are managed, for example, in the form of so-called "style specification sheets." The present application may be integrated with one or more software tools currently in use by the fashion industry, which also saves costs and adds convenience. The detailed forms of information, including CS and PS measurement information used by the present application may be obtained by others in the fashion industry without significant IT-related overhead costs. Moreover, the comprehensive and real-time collection of data by the present application in connection with consumer sizes and interests is usable by fashion companies to improve prediction and planning for future collections and lines of apparel. The result is a significant savings in both time and cost.

Figure 5:
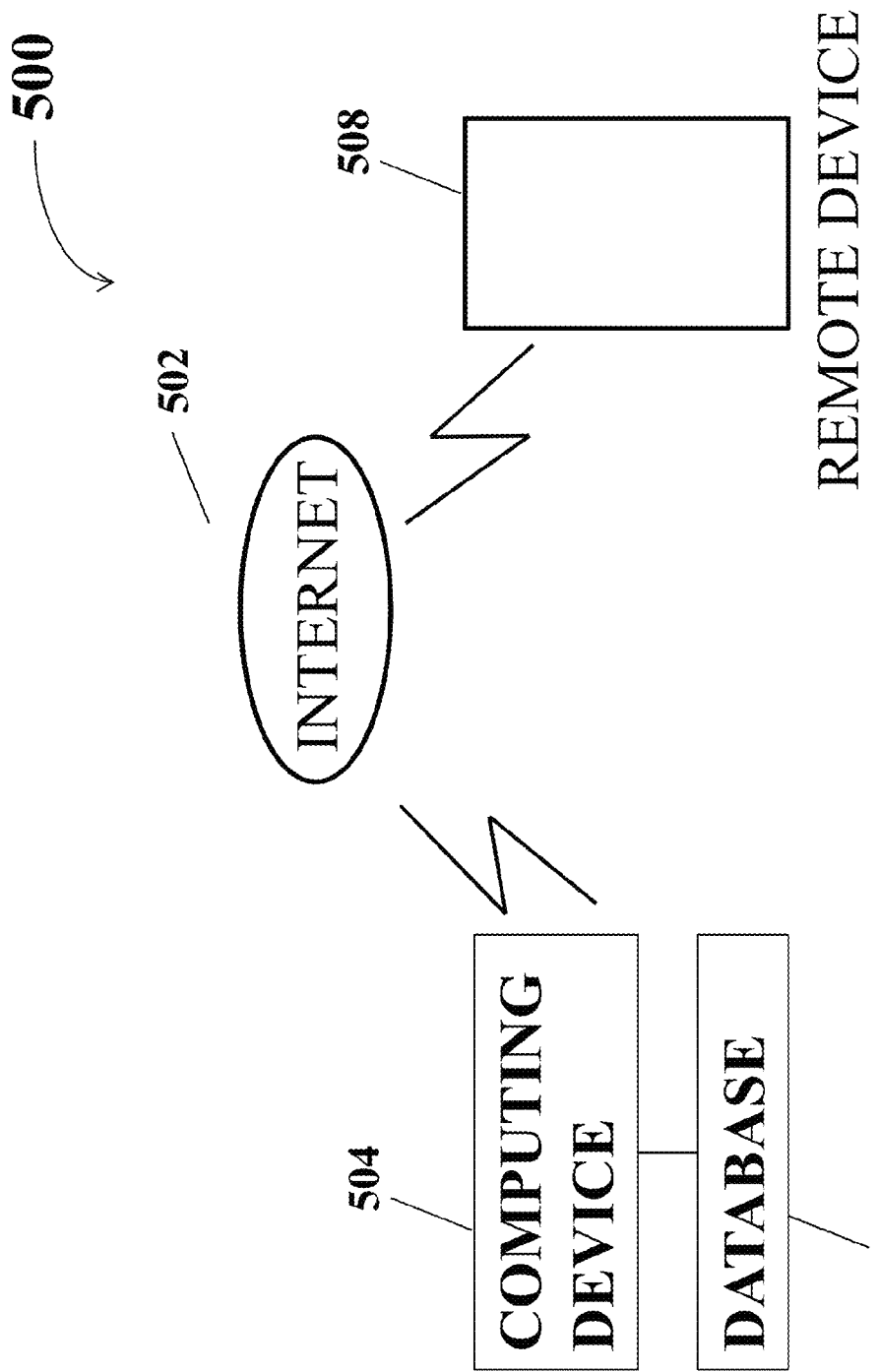
FIG. 5 is a block diagram illustrating a system in accordance with an implementation of the present application.

FIG. 5 is a block diagram illustrating a system 500 in accordance with an implementation of the present application. The system shown in FIG. 5 uses a bidirectional data communications network 502, such as the Internet, to establish a communication link that connects remotely located computing devices 504. The computing devices 504 may be configured to connect to send/receive various forms of data (e.g., PS information 108, CS information 104 and other forms of data shown and described herein). The computing device 504 may utilize commonly used network programming platforms, databases 506 and protocols, such as shown and described herein. The computing device 504 may further connect to networks and databases using commonly understood programming interfaces and interface modules, e.g., Media Server Pro, Java, Mysql, Apache, Ruby on Rails, and other similar application programming interfaces and database management solutions. It will be appreciated that the system of implementations of the present application offers broad adaptability to user configurations, multiple user inputs, and hardware configurations. Moreover and as noted herein, the present application allows for a wide variety of remote devices 508 (portable computer, desktop, PDA, smart-phone, camera phone, web camera, or the like) to interface seamlessly notwithstanding different makes, models and settings of various containing devices.

Figure 6:
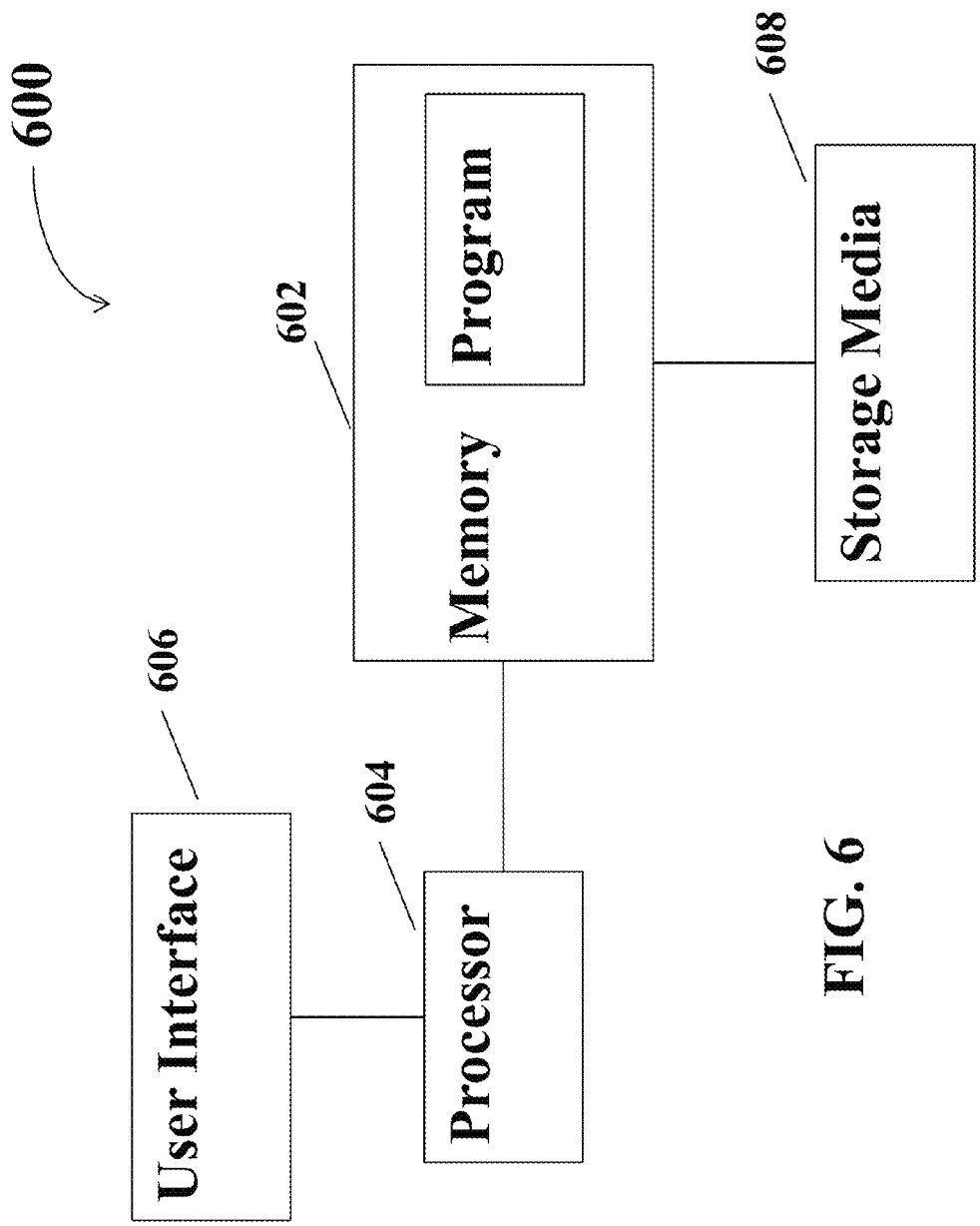
FIG. 6 illustrates components associated with a computing device in accordance with an implementation of the present application.

FIG. 6 illustrates components associated with a device 600, which may be a mobile computing device such as a portable computer, desktop, PDA, smartphone, camera phone, and web camera is configured for employing features described herein. The device may include a user interface, processor, memory and/or camera. The device may comprise one or more of any number of commercial devices or systems that are capable of capturing optical data through a lens and transmitting an image file that includes the captured data, such as a smartphone running the ANDROID operating system and which has a camera for capturing images. Although the device is represented herein as a single device, it is not limited to such, but instead can comprise a camera coupled to another system that enables image transfer over a network to the computing device of FIG. 5.

Continuing with reference to FIG. 6, a memory 602 is provided for storing data and instructions suitable for controlling the operation of the processor 604. Such memory may include, for example, a random access memory (RAM), a hard drive and a read only memory (ROM). One of the components stored in memory is a program. Program instructions may be provided for controlling the processor to execute steps associated with the present application. The program may be implemented as a single module or as a plurality of modules that operate in cooperation with one another. The program is contemplated as representing a software embodiment of the modules that implement the functionality and methodology described herein.

A user interface 606 may be provided that includes an input device, such as a keyboard, touch screen, tablet, or speech recognition subsystem, for enabling a user to communicate information and command selections to the processor. In the case of a touch screen, the input and output functions are provided by the same structure. Moreover, an output device such as a display or a printer may further be provided. A cursor control such as directional keys, a mouse, track-ball, or joy stick, can be employed to enable the user to manipulate a cursor on the display for communicating additional information and command selections to the processor, in embodiments in which the display is not a touch screen.

Program instructions may be configured on a storage media 608 for subsequent loading into one or more memories. The storage media may be any conventional storage media such as a magnetic tape, an optical storage media, a compact disc, or a floppy disc. Alternatively, the storage media may be a random access memory, or other type of electronic storage, located on a remote storage system.

The present application is now further shown and described in connection with one or more implementations, which may be shown and illustrated under the name, "EYE-FITU." In one or more implementations, the present application may be entitled "ONE-SCAN FITTING."

In one or more implementations, user profile information is received that is used in operation and to determine whether a particular article of clothing will fit a user suitably well. For example, PS information 108 is submitted, accessed and/or updated via data entry display screens provided on a mobile computing device.

Figure 7:
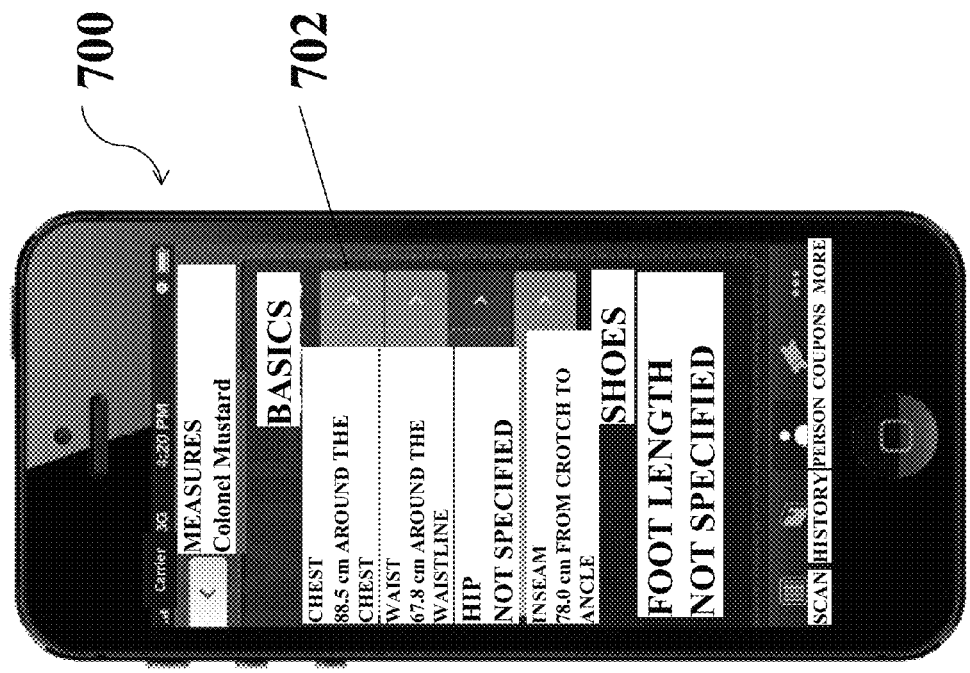
FIG. 7 illustrates an example screen display of a mobile computing device for receiving profile information.

After initially registering, such as by submitting a name and e-mail address, the present application supports obtaining individual measurements in various ways. FIG. 7 illustrates an example screen display 700 of a mobile computing device configured for receiving profile information. In the example shown in FIG. 7, options are provided for a user to enter basic measurement information. For example, options 702 are provided for entering a chest measurement, a waist measurement, a hip measurement, an in-seam measurement and a foot length (e.g., for shoes). In the example shown in FIG. 7, measurements have been received for chest, waist, and in-seam. The remaining options (hip and foot length) are shown as "not specified."

Figure 8:
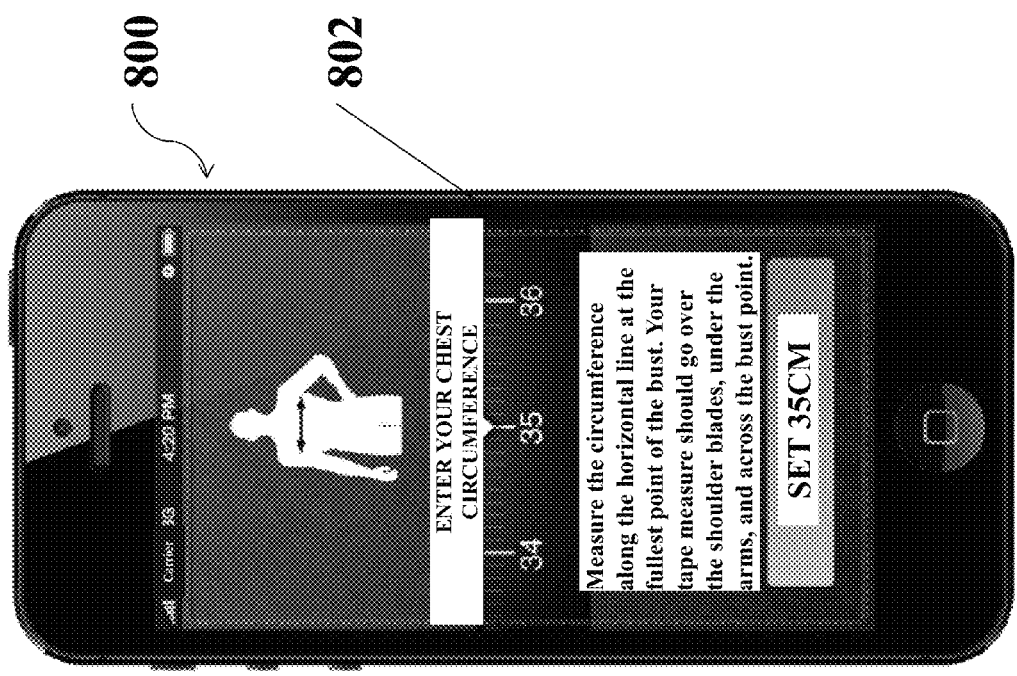
FIG. 8 illustrates an example display screen for entering chest circumference information.

FIG. 8 illustrates an example display screen 800 for entering chest circumference information, corresponding to a selection of options 702. In the example shown in FIG. 8, an arrow control 802 is selected for identifying a particular measurement. The user is prompted in display screen 800 how to use a tape measure to measure the circumference along the horizontal line at the fullest point of the bust. In the example shown in FIG. 8, the user's circumference is 35 centimeters.

Figure 9:
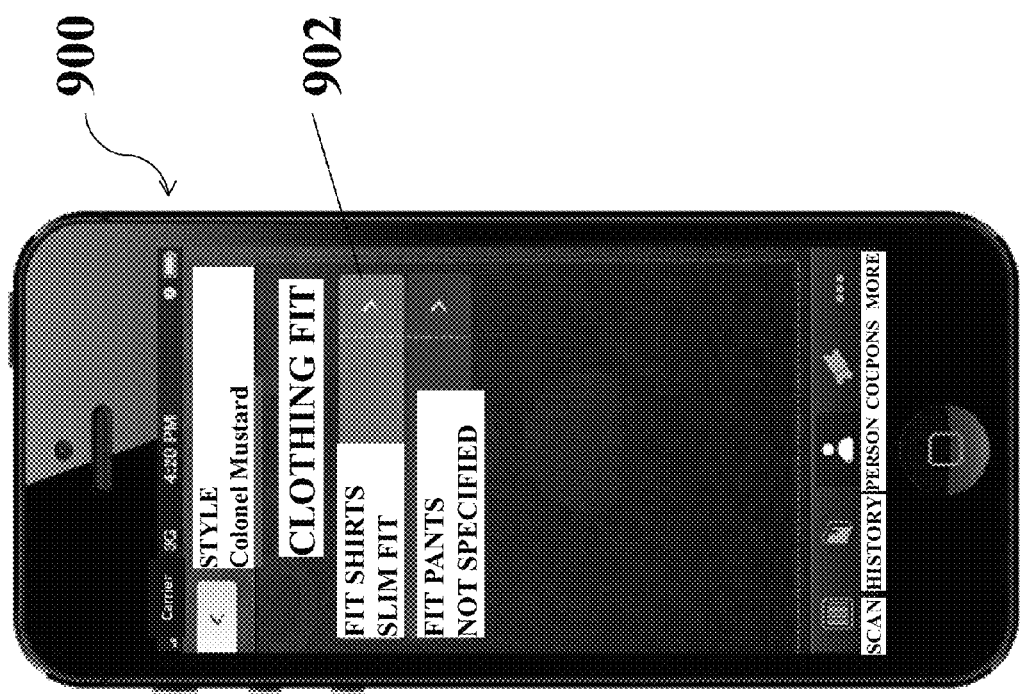
FIG. 9 illustrates an example display screen for entering profile information associated with a user's preferred style fit for clothing.

FIG. 9 illustrates an example display screen 900 for entering profile information associated with a user's preferred style fit for clothing. Example options 902 are provided for submitting style preferences associated with shirts and pants.

Figure 10:
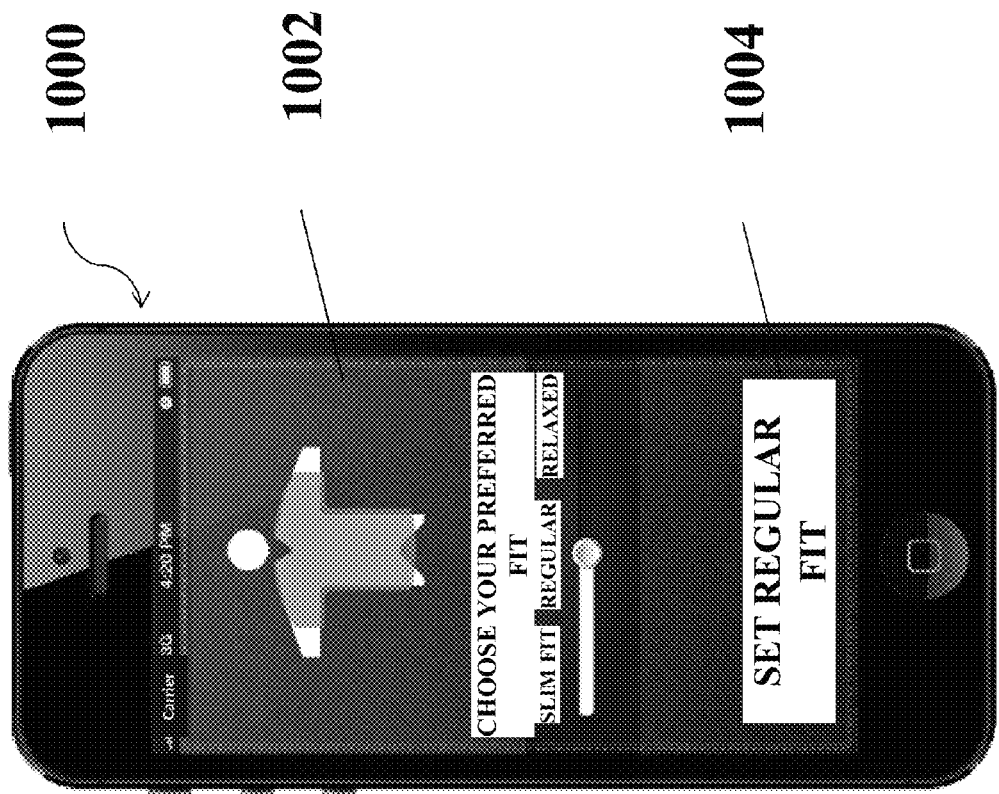
FIG. 10 illustrates an example display screen for submitting style preference information associated with shirts.

FIG. 10 illustrates an example display screen 1000 for submitting style preference information associated with shirts. As illustrated in FIG. 10, a slider control is selecting within a range of options associated with slim fit, regular fit and relaxed fit. Moreover, a graphical representation 1002 is provided that illustrates a human torso and how the respective fit selection would appear to fit. Also as shown in the example display screen 1000, the user selects button 1004 to select the respectively selected fit (e.g., "regular").

Figure 11:
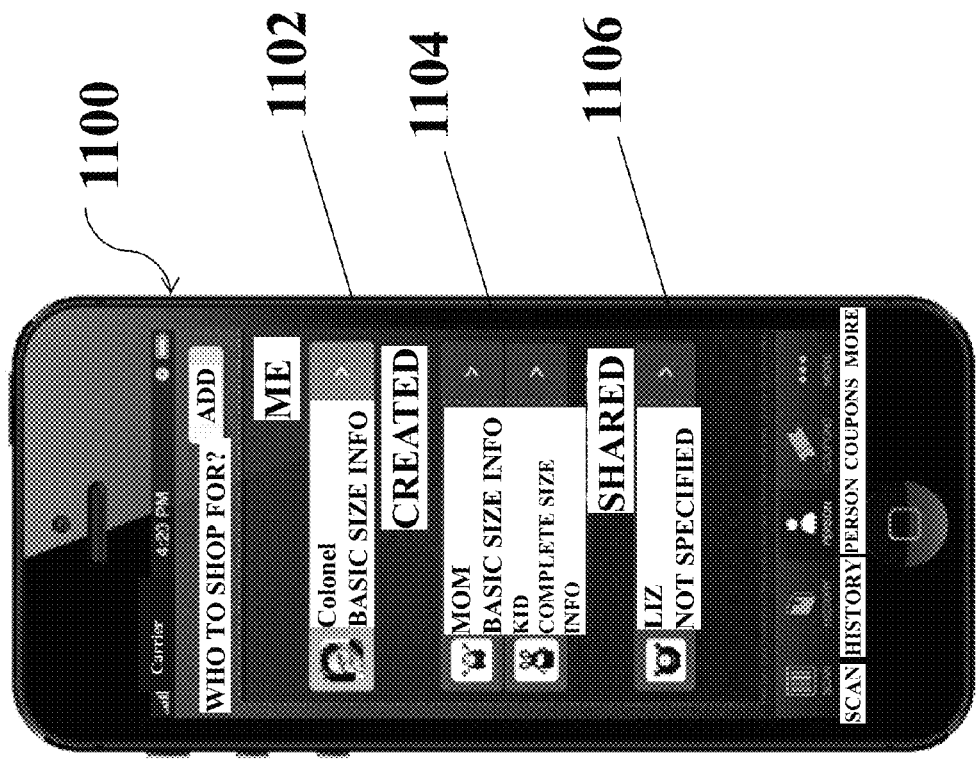
FIG. 11 illustrates an example display screen for submitting or otherwise identifying profile information for the user and family members.

In addition to submitting profile information associated with a user, the present application supports submitting (or otherwise identifying) profile information associated with a plurality of people. FIG. 11 illustrates an example display screen 1100 for submitting or otherwise identifying profile information for the user ("Me") 1102 and family members ("Created") 1104. Moreover, PS information 104 associated one or more shared users 1106 (shown as "Liz—Not Specified") may be accessed. By enabling the ability to enter and access PS information 108 for the user, family and friends, as well as to access shared user profile information, users of the present application can select from a plurality of people to shop for.

Figure 12:
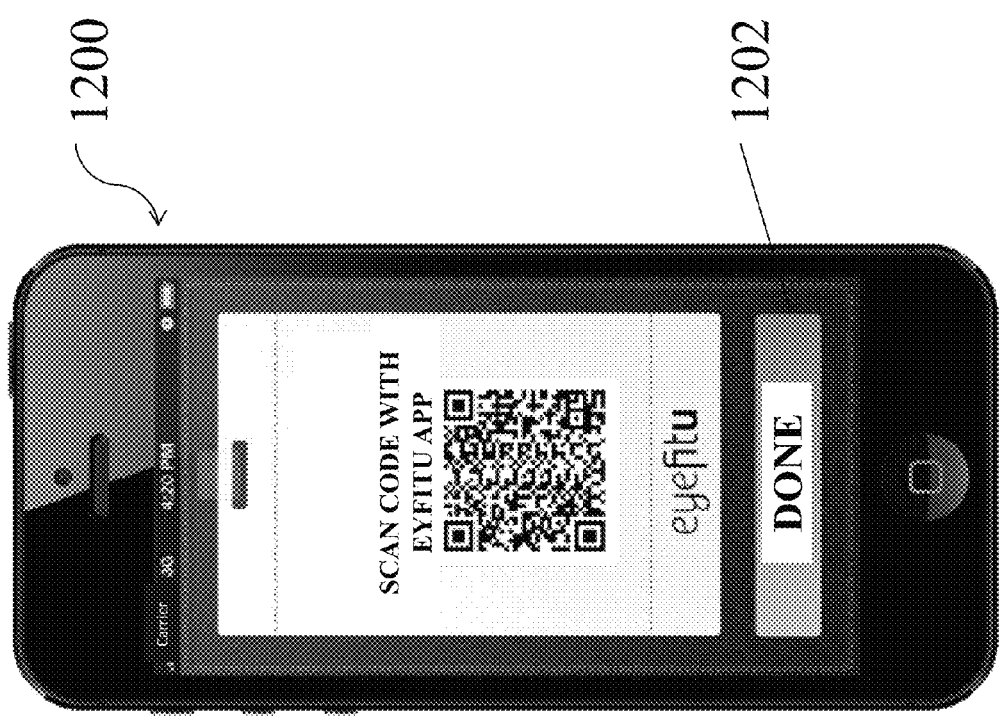
FIG. 12 illustrates an example display screen that prompts the user to scan a code using the software application running on the user's mobile computing device.

In addition to submitting, viewing and/or editing profile options associated with PS information 108, options may be provided for a user via computing device display screens to determine whether an article of clothing fits suitably well. FIG. 12 illustrates an example display screen 1200 that prompts the user to scan a code using the software application running on the user's mobile computing device. When the user is finished scanning, the user selects Done button 1202.

Figure 13:
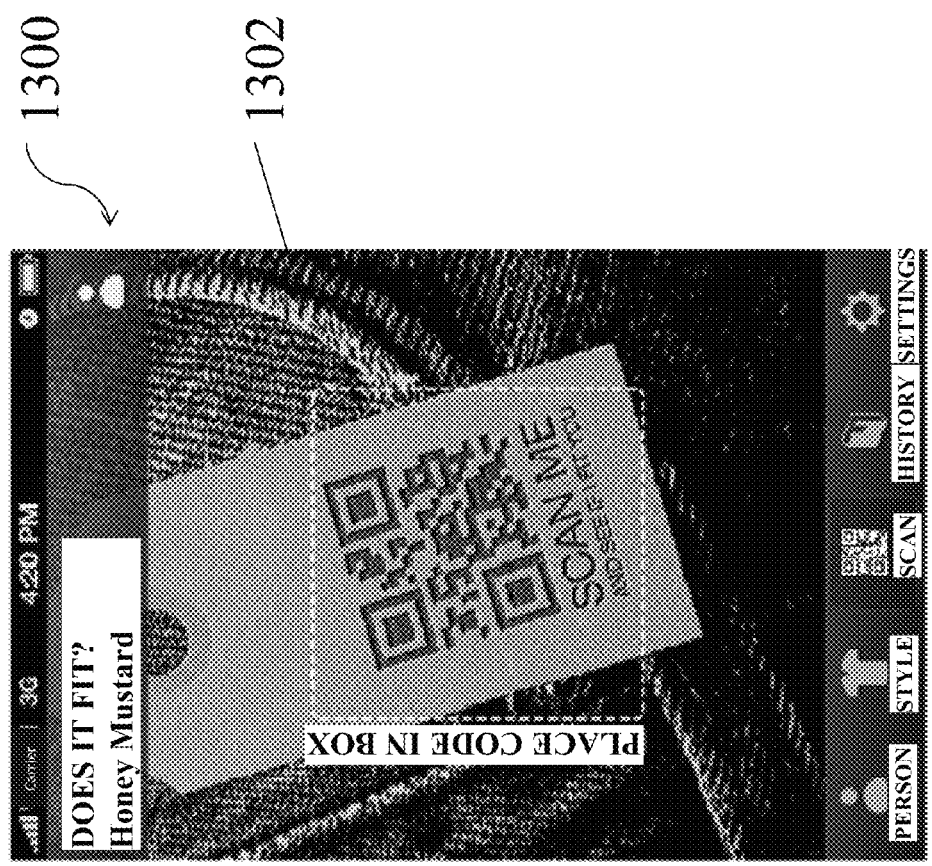
FIG. 13 is an example display screen for scanning a code associated with an article of clothing in accordance with one or more implementations of the present application.

FIG. 13 is an example display screen 1300 for scanning a code associated with an article of clothing in accordance with one or more implementations of the present application. As shown in FIG. 13, preview screen 1302 displays a box in broken lines indicating to the user where to position the code associated with the article of clothing for proper scanning.

Although many of the descriptions and drawings herein relate to mobile computing devices, such as smartphones and tablet devices, virtually any device that is capable reading a machine-readable code may be suitable in connection with the teachings herein. For example, GOOGLE GLASS may be used to scan a machine readable code that is provided with or otherwise associated with one or more articles of clothing. This provides a convenient and more discreet way of reading a code, particularly in a public location such as a brick-and-mortar store.

Figure 14A:
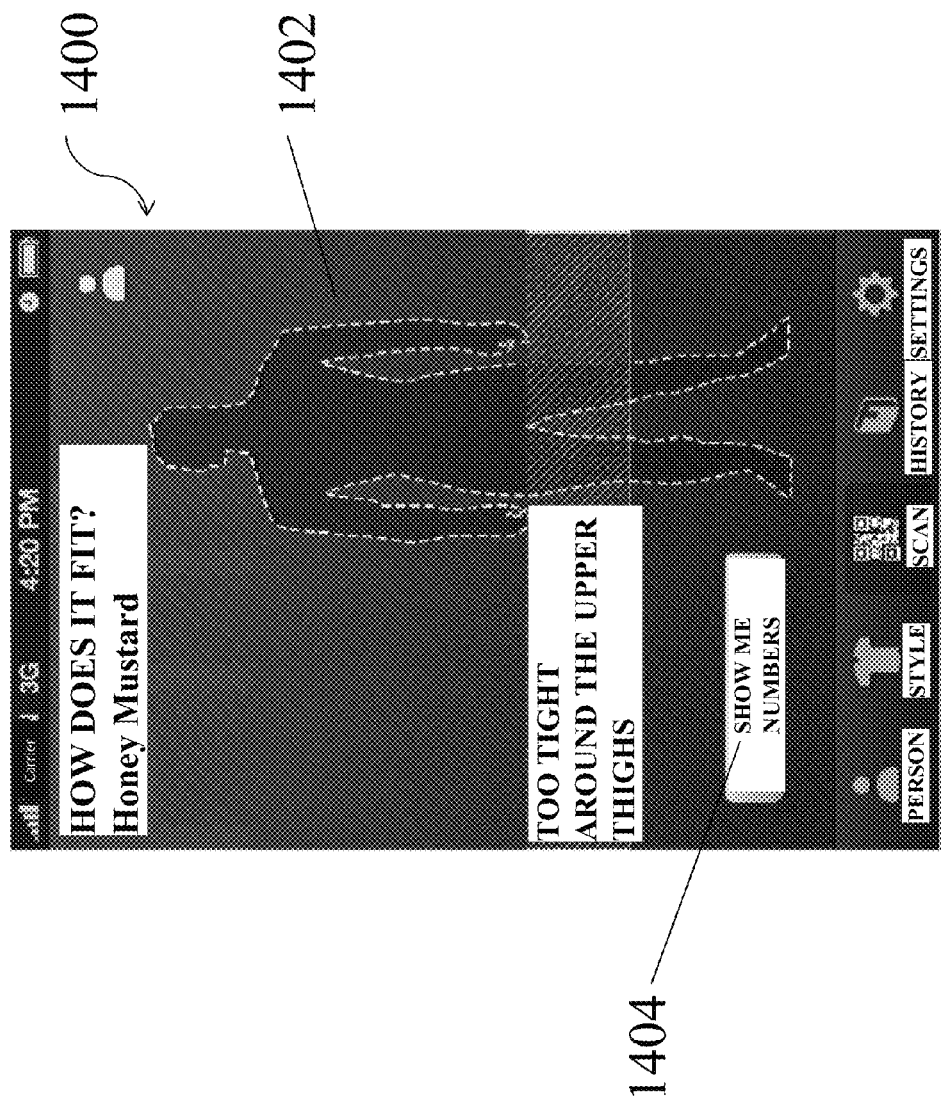
FIG. 14A illustrates an example display screen that provides a reason why a respective article of clothing does not fit suitably.

Once scanned, an indication is provided to the user whether the article of clothing fits properly or not. In case the article does not fit properly, options are provided to inform the user one or more specific reasons. FIG. 14A, for example, illustrates an example display screen 1400 that provides a reason why a respective article of clothing does not fit suitably. In the example shown in FIG. 14A, a graphical display section 1402 is provided that includes a representation of a human body and a statement that the article of clothing is too tight around the upper thighs. Show Me Numbers button 1404, when selected, results in specific numbers that are provided to the user that specifically represent why the article of clothing does not fit well. For example, specific values may be provided detailing why an article of clothing does not fit.

Figure 14B:
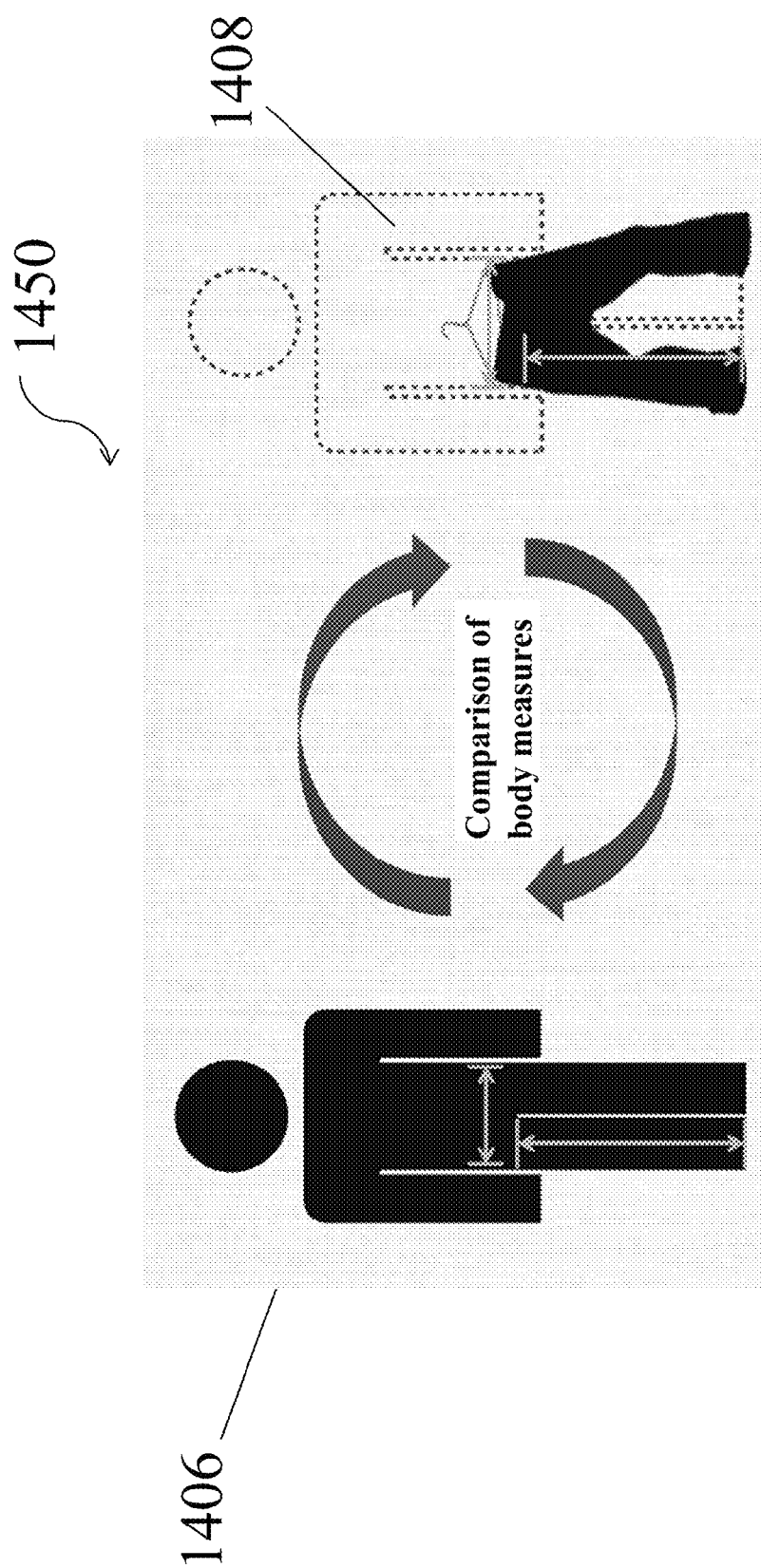
FIG. 14B illustrates an example comparison of an individual's body measurements with body measurements associated with a reference body.

FIG. 14B illustrates an example comparison of a user's body measurements 1406 with body measurements associated with a theoretical reference body 1408. The comparison illustrated in FIG. 14B considers physical body measurements of a person, such as described herein, as well as a reference body that is determined to fit a particular garment. In the example shown in FIG. 14B, the reference body 1408 is illustrated in broken lines and a pair of trousers is illustrated that fits the reference body 1408. In the example shown, a double-arrowed vertical line positioned in the reference body 1408 corresponds with the double-arrowed vertical line positioned over the user 1406. This indicates a suitable fit with respect to length. In the example shown in FIG. 14B, there is no corresponding horizontal double-arrowed line, which represents that the trousers would not fit the user. Thus, the present application provides a convenient sizing chart representing whether an article of clothing suitably fits a user. Moreover, the user may be provided with one or more recommendations of alternative brands, styles and/or sizes, for example, which may be represented by the reference body 108 that substantially corresponds with the user's (or target person's) body measurements 1406. Thus, the reference body 1408 is well-suited for providing recommendations, as well.

In one or more implementations, a fitting approach associated with various clothing sizes and reference models is provided. For example and for a particular size of clothing, an associated reference body model may be provided. Information associated with reference body models (e.g., for a relative interpretation of clothing sizes) may be used. In accordance with one or more implementations of the present application, body measurements associated with a corresponding reference body model are stored in one or more databases and referenced in connection with respective clothing sizes. Given a specific user and article of clothing, for example, the present application may compare the body measurements of the user with the body measurements of the reference body model associated with the specific size of the article clothing. Thereafter, a fitting estimate and detailed fit information may be derived based on differences between the user's body shape and the shape associated with the reference body model. By comparing the body measurements of the user to the reference body model for available sizes of a piece clothing, fitting recommendations may be provided to the user. For example, a recommendation may be made that the user should select a smaller size. In addition to a correlation of the reference body model with the user's respective size measurements, such recommendations may be made in accordance with size and fit preferences identified by the user.

Figure 15:
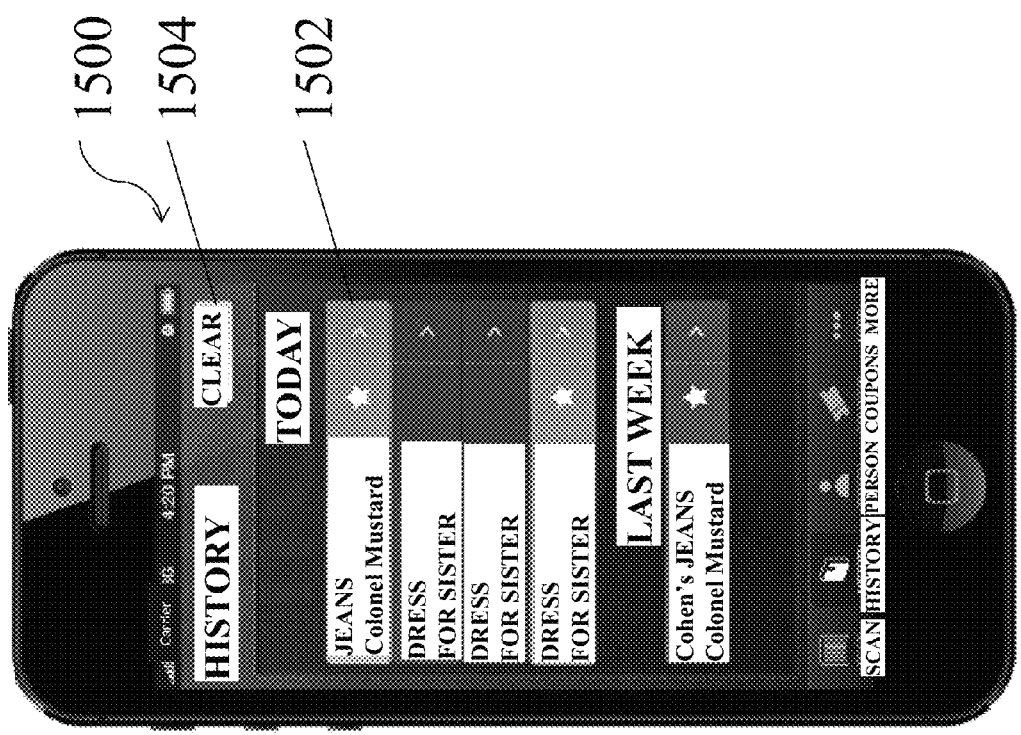
FIG. 15 illustrates an example display screen that provides historical information associated with previous scans of clothing made by a user.

As a user of the present application enters information, such as relating to scans of codes associated with articles of clothing, an historic archive may be maintained and provided of previously scanned clothing. FIG. 15 illustrates an example display screen 1500 that provides historical information associated with previous scans of clothing made by a user. As shown in FIG. 15, the user has scanned jeans and a dress today, and jeans during the last week. Details associated with those scans, such as whether the clothing fit suitably well, may be provided after a user selects a corresponding graphical screen control, such as an arrow, associated with the respective historical record. Also and as shown in FIG. 15, information is provided that represents the person from whom the clothing was intended for. For example and as shown in FIG. 15, the clothing may have been scanned for the user or the user's sister. It is recognized herein that some users may not want a historic record of scans maintained and, accordingly, Clear history button 1504 is provided that, when selected, erases one or more historic records of clothing scans.

Figure 16A:
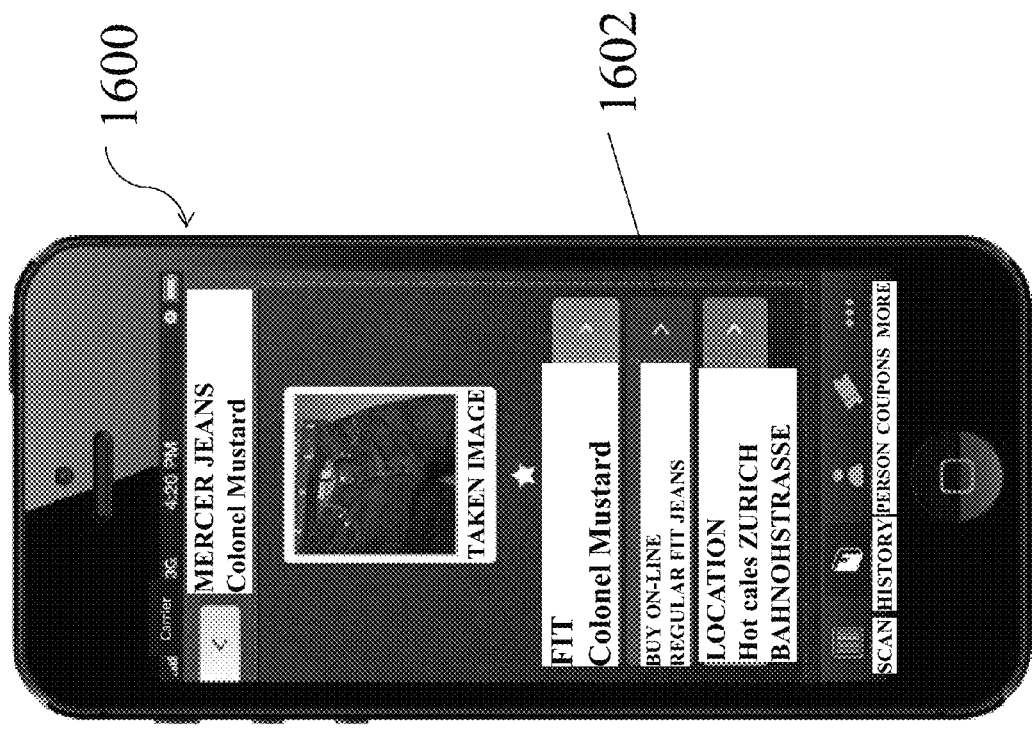
FIG. 16A illustrates an example display screen that provides information associated with a respective article of clothing.

FIG. 16A illustrates an example display screen 1600 that provides information associated with a respective article of clothing. In the example shown in FIG. 16A, a pair of jeans is represented and selectable options 1602 are provided for the user to access information associated therewith. In the example shown in FIG. 16A, options are provided for accessing associated with the fit of the jeans, to purchase the jeans on an e-commerce on-line site, and to identify one or more brick-and-mortar stores where the jeans may be available for sale. Thus and as shown in display screen 1600, options are provided for the user to locate conveniently both on-line and physical locations for purchasing clothing, as well as to identify fit information. In this way, the present application provides a convenient and useful tool for purchasing clothing that a user is assured will fit well.

Figure 16B:
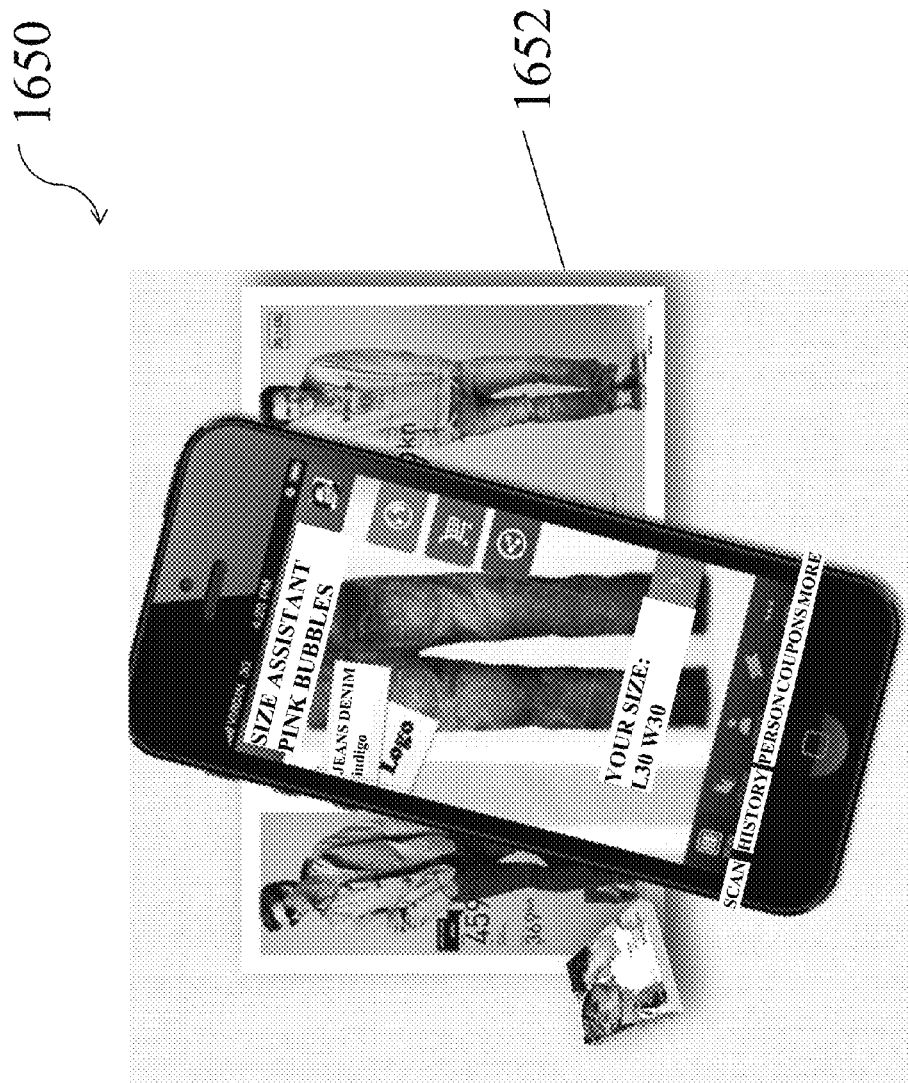
FIG. 16B illustrates an example display screen that represents an image captured from a catalog and associated functionality provided in accordance with an implementation of the present application.

FIG. 16B illustrates an example display screen 1650 that represents an image captured from a catalog and associated functionality provided in accordance with an implementation of the present application. For example, an image from a catalog is captured via a mobile computing device, and image comparison occurs with one or images formatted as CS information 104, to identify the particular article of clothing set forth in the catalog. Moreover, a person's PS information 108 is referenced, substantially as shown and described herein, to determine whether the respective article of clothing fits suitably well. Thus, in one or more implementations, a user can scan an image in a catalog or other location, or take an image of an article of clothing, and, thereafter, determine substantially automatically whether the clothing fits suitably well. In one or more implementations, additional recommendations may be made, such as for alternative articles that would be more suitable This, for example, provides an improved feedback loop of information for users in a very convenient way, including from the setting of their own homes.

Figure 17:
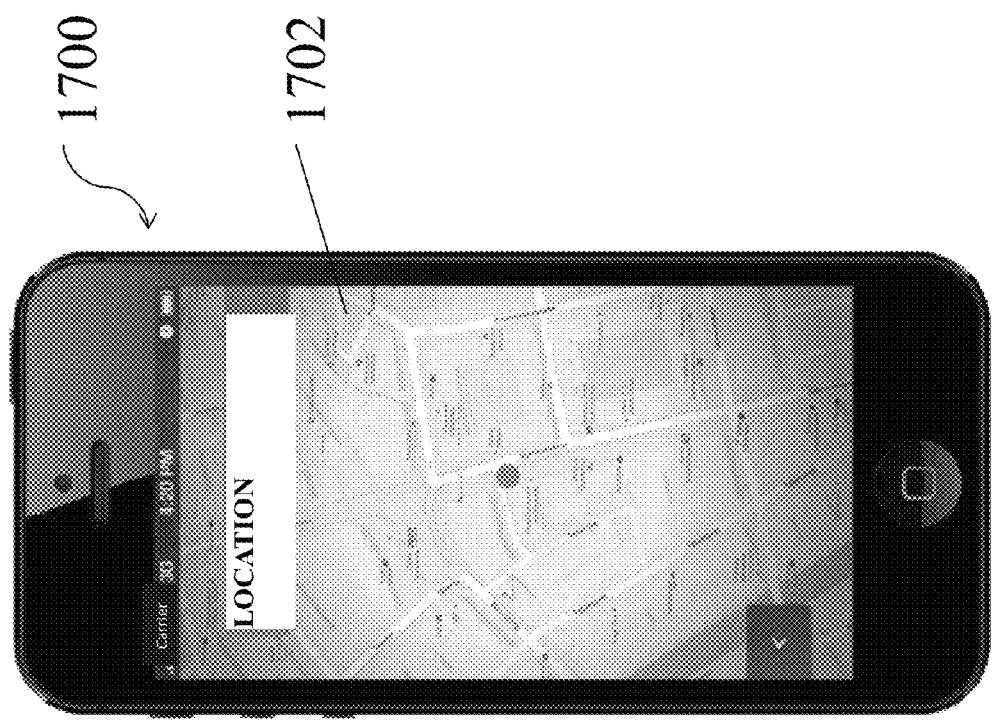
FIG. 17 illustrates an example display screen that provides a map showing a physical location where a respective article of clothing may be located.

FIG. 17 illustrates an example display screen 1700 that provides a map 1702 showing a physical location where a respective article of clothing may be located. Display screen 1700 may be provided in various contexts, such as when a user selects the location option in display screen 1600. Other contexts may include, for example, when a specific store does not have a specific article of clothing in stock. In such case, map 1702 may show locations of alternative stores where the clothing article may be located. In another context, map 1702 may show locations near a user where a clothing article is located. The locations may be relative to the physical location of the user, such as determined by a GPS signal associated with the user.

Figure 18:
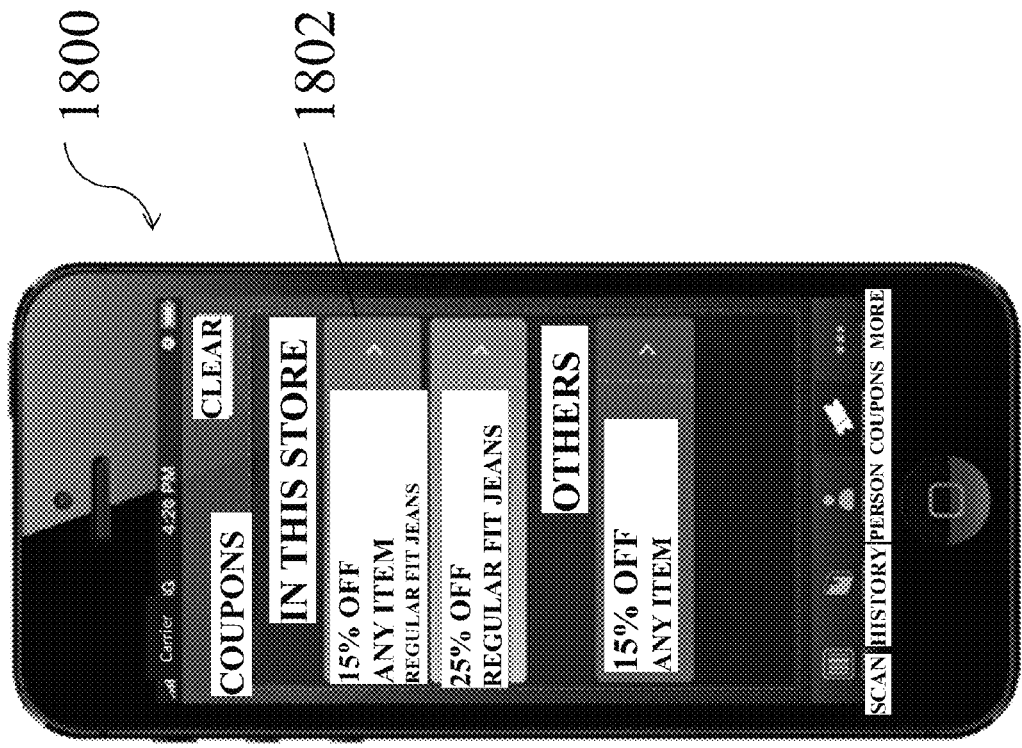
FIGS. 18-20 illustrate example display screens illustrating functionality associated with discounts and special offers that are accessible via one or more implementations of the present application.
Figure 19:
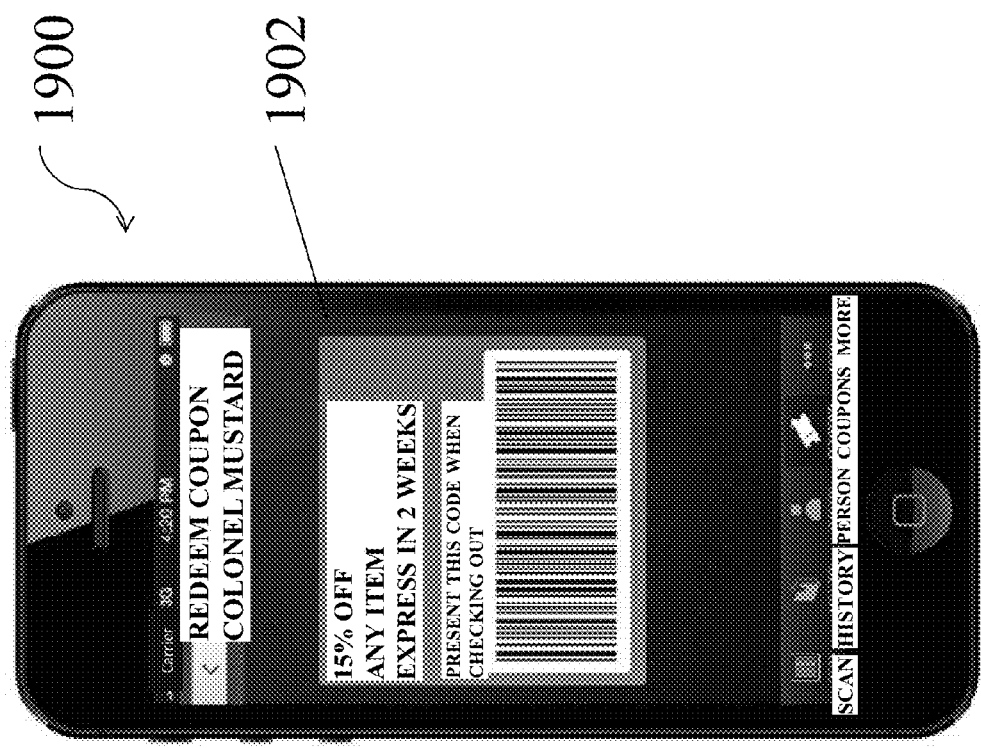
Figure 20:
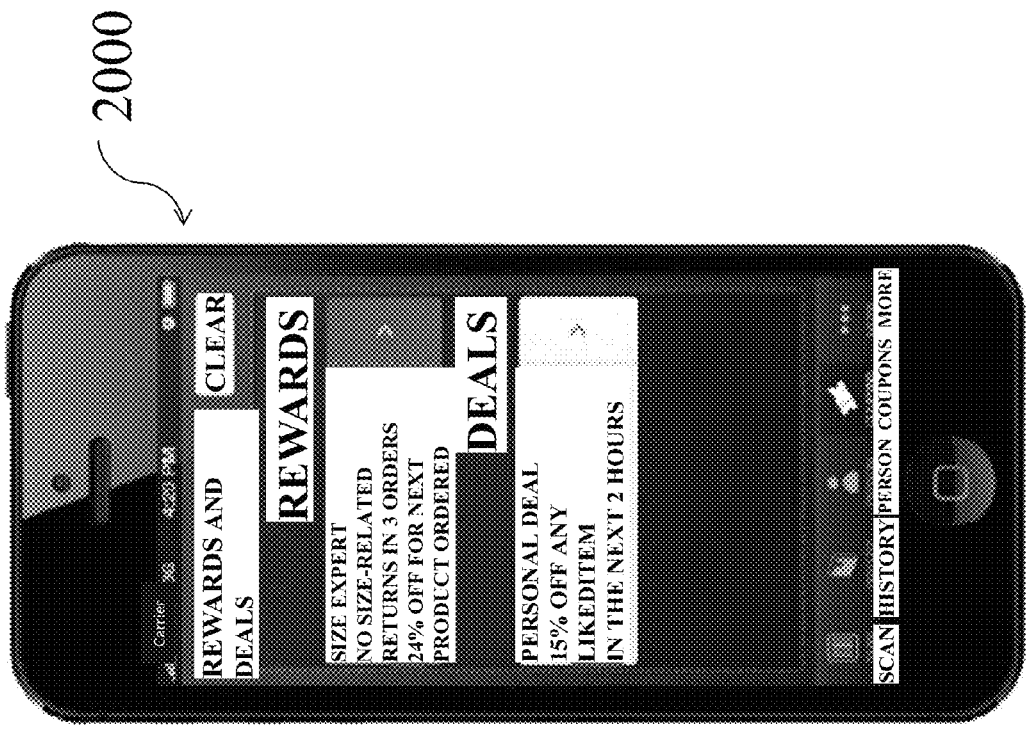

In addition to size and location information, the present application may provide information associated with coupons, rebates or other offers associated with articles of clothing or a shop. FIGS. 18-20 illustrate example display screens illustrating functionality associated with discounts and special offers that are accessible via one or more implementations of the present application. FIG. 18 illustrates an example display screen 1800 that includes special discounts 1802 offered at specific locations. In the example shown in FIG. 18, discount offers are shown for a particular item or any item at a particular location, and for any item offered at other locations. When a user selects an option for an offer, then a code may be displayed on the user's computing device. For example, FIG. 19 illustrates an example display screen 1900 that includes a barcode in coupon section 1902 for a 15% discount. The user is prompted to present the barcode at checkout, and that the offer expires within two weeks. Once presented, the salesperson can scan the code directly from the user's display screen.

As noted herein, a benefit provided by the present application regards a reduction or elimination of clothing returns due to improper fit. In one or more implementations, additional discount offers or other benefits are provided for users who purchase clothing using at least one of the features shown and described herein, and do not return the clothing. For example, and as shown in display screen 2000 (FIG. 20), a reward is offered provided to a user for not returning any of the clothing associated with the user's previous three orders. In the example shown in FIG. 20, a 25% discount is offered off of the price of the next order, and a 15% discount off of the price of any linked item. The 15% discount offer is limited to a short time-period, and is offered for the next two hours. In this way, users are prompted to act with enticing discounts that expire in short time.

The present application ensures that access to consumer measurements is restricted to those parties authorized by the respective users. For example, when shopping for friends, users use the profile of their friends to find items that fit them, but can't see the specific measurements of their friends. Even when shopping online, users don't have to give away their measurements to a specific web shop. This mitigates a known problem of online system, in which users are asked to enter their body measurements: people usually cheat, making themselves, for example, thinner than they really are. In case users are ensured the confidentiality of their data on their personal mobile phone, they are less likely to do so.

Garment measurements can either be stored on servers, or, if according measurements are already available in a merchant's system, can remain solely on the merchant's systems and under the merchant's full control. Moreover, the software application of the present application uses a fast and simple way for consumers to identify a specific piece of clothing. Entering a product's name using the phone's soft keyboard may be too error prone, cumbersome, and time-consuming. There are several alternatives for an automated recognition available. One way is to use the smartphone's camera to scan one of the bar codes already present on the product label attached by the shop or manufacturer. This way, no additional effort is required to rollout and manage new labels. Dedicated labels may be used in case consumers are able to use the present application while offline. The present application labels feature a QR code that contains already all relevant information about the piece of clothing, specifically the item's measurements. In an embodiment, the product information and measurements stored in the present application label may be encrypted, preventing unauthorized access to this data. As new technologies arise, the present application supports other identification technology as well. For example, if the proliferation of an item-level tagging with RFID technology is further advanced throughout the apparel industry, identifying items by simply touching the tag with NFC (Near Field Communication)—enabled mobile phones would be a preferred option.

With regard to a consumer, the present application provides a seamless and adaptive acquisition of physical measurements. Simply by providing very few and relatively basic size measurements, a person may enjoy the teachings herein. For example, initially a user may provide only his/her known chest, waist and length information and may provide such information in a convenient size format (such as United States, European, or the like). This allows a consumer to enjoy use of the teachings herein without a substantial initial investment of effort and time to provide accurate body measurements and without a requirement of knowledge of specific (e.g. style and international) standards. In one or more implementations, the present application is applicable by using basic measurement information although, it is recognized that the more information that a user supplies may increase the likelihood of achieving precise results. In one or more implementations, additional and precise information associated with body size and measurements may be submitted by users at virtually any convenient time. Such information may be stored locally in a user's computing device, such as a smartphone, or may be stored remotely, such as via the Internet.

In one or more implementations, a user obtains a set of standardized body measurements using a simple measuring tape and provides the measurement information, such as by filling in a data entry form, uploading a data file or other suitable way. Of course, one skilled in the art will recognize other measurement tools and methods are supported by the present application, such as a body scanner. The present application may include an application programming interface ("API") for receiving information from body scanning and other technology, which may be added to one or more databases. Moreover, as a person's body size and measurements change over time, measurement information may be repeatedly entered and updated to ensure current and accurate fitting.

The present application further supports multiple consumer profiles, thereby allowing consumers not only to shop for themselves, but also to shop for other people, such as for friends, family members, team members of a sports team, club and/or league. This may be possible, for example, by enabling users to share accurate size information with others and to store such information directly in a smartphone or other suitable mobile device. In addition to size information, users may store their own and others' preferences with regard to clothing fit and style.

Accordingly, customers can shop with confidence for family and friends as the present application supports the sharing of "person profiles." For merchants, the present application improves the efficiency of their businesses. In brick-and-mortar stores, reduced demand on assistants and dressing rooms can significantly reduce the "dead time" of customers (including time spent waiting in shops without engaging with products), especially during peak times. Furthermore, the present application offers real-time, high-quality analytics information about consumers, trends, and sizes in demand, not available otherwise. One specific example of a unique service the present application provides is real-time notification of staff in case a very loyal customer enters the store. For online shops, the present application reduces the number of returns, as customers can do a fitting check before buying a piece of clothing. In connection with purchases, a user can select a profile of the person (s)he wants to shop for before scanning a label or QR code.

Moreover, the present application supports information sharing, such as size and preference information, with family, friends and sport team members. This supports the purchase of clothing for others with an unprecedented assurance of a correct fit. The system also enables substantially real-time integrated feedback, such that when a person scans a machine-readable code (e.g., a QR code), data are transmitted to one or more parties associated with the clothing thereby providing near real-time size information of people who are doing the scanning. This provides a market feedback loop to interested parties in substantially real time, and provides valuable, updated and current data.

The application provides consumers with functionality to store and manage a copy of their size information and preferences locally, such as on a mobile computing device, and/or remotely on another computing device, as well as to scan clothing labels and other suitable tags that contain CS information 104, as described herein. Moreover, a mobile computing device software application may implement and run the matching algorithm in order to present the results of the algorithm to the user.

Consumers can use their smartphones or other suitable mobile computing devices in brick-and-mortar stores to check whether clothing fits, simply by scanning the attached clothing tags. Once the consumer finds an item that the consumer finds appealing, the consumer scans the QR code to ensure that the piece of clothing fits well. This eliminates the time-consuming and cumbersome task of trying on several sizes in a dressing room, and also greatly improves the shopping experience as a whole.

Other services associated with CS information 104 and PS information 108 are supported in connection with the teachings herein. For example, after granting merchant personnel access to personal size data, consumers may be presented with a list of all well-fitting pieces of a desired type of clothing in the shop. Moreover, a prominent poster or note placed in a clothing shop, for example, next to labeled clothes or in the dressing rooms, informs users about the service and also feature a QR code. In this way, the QR code acts links the consumer's mobile computing device web software to the mobile computing device software application, such as described above, and allows customers to download the application. Further, customers may be entitled to receive discounts on certain items when using a system in accordance with the present application, which acts as an incentive to increase and train the user base.

As noted herein, the present application is well-suited for e-commerce clothing purchases, in addition to purchases made in a brick-and-mortar store. Being able to determine how well a piece of clothing fits without trying it on provides a huge improvement for the online shopping experience of consumers. Moreover, the number of returned clothes purchased online is severely reduced due to the teachings herein and saves enormous associated costs for business owners.

As noted above, the present application supports providing a software application to operate on a user's mobile computing device. The mobile application supports major mobile operating systems (e.g., IOS, ANDROID, BLACKBERRY, etc.), to provide a convenient and fast way for consumers to employ the teachings herein while shopping.

A matching algorithm may be used in connection with other services, including to provide a recommendation for the consumer, to state whether a specific article of clothing fits, and to provide other information, such as whether an article of clothing complies or does not comply with a respective user's style preferences. The algorithm may be included with or implemented in an application running on the user's smartphone or other suitable mobile computing device, or may be accessed remotely, such as from a server computer.

Consumers may use mobile computing devices to scan a tag associated with an article of clothing and immediately obtain size information that represents accurate measurements of the clothing. Further, the present application provides substantially automatic size conversion, including via electronic data interchange ("EDI") conversion, which enables people to compare sizes based on real physical measurements and not based on a manufacturer's subjective and often inaccurate idea of the clothing's size. Such conversion supports a plurality of formats, including metric (cm) to standard (inches) conversion.

In one or more implementations of the present application, a virtual clothing shop provides one or more features of the present application in connection with, for example an Internet web site. The web site may include optical codes corresponding with CS information 104 along with editorial descriptions of a product. Consumers scan the code with their smartphone or other suitable mobile computing devices from the display screen of a PC, tablet or other suitable mobile computing device to determine whether the selected piece of clothing fits properly. One major advantage of this approach is that no significant changes to the Internet website virtual clothing shop itself are required. Simply by maintaining updated CS information 104, consumers are provided access to significant amounts of information that assure proper fits.

In accordance with one or more implementations, the following options may be provided to customers in case a brick-and-mortar store or online virtual store is out of stock of a particular article of clothing. In one or more implementations, the article of clothing may be ordered automatically, without further customer input. The article of clothing may further ship directly to the customer's preferred location, or the customer may be notified when the article is received by the store for pickup or delivery. In another implementation, the customer is prompted to order the article of clothing, such as by making a selection (i.e., clicking) at the store or on the website. Once ordered, the article of clothing may ship directly to the customer's preferred location, or the customer may be notified when the article is received by the store for pickup.

In another implementation, no further action is taken after a customer is notified that a store is out of stock of an article of clothing, and when the customer goes home or logs on to check his or her e-mail thereafter, the customer receives an e-mail from the store. The store may apologize, for example, for not having the article of clothing in stock and asks the customer if the store can order the article for future delivery. Alternatively, in the future when the article of clothing comes in, an e-mail message may be sent to the customer reminding the customer that (s)he had been looking for that article previously. The e-mail may further include a discount offer should the customer come down to the store to pick up the article of clothing within a period of time, such as 48 hours. This has the added benefit of getting a customer back into a store for possible additional purchases. In another implementation, after the article comes in an e-mail message may be sent to the customer prompting the customer if he or she would like it shipped to her home. An additional discount offer may also be made.

The present application may provide a user interface for merchants to set one or more options associated with the teachings herein. For example, options may be provided for communications, such as the e-mail messages described above, to be sent automatically to one or more potential buyers on behalf of a merchant. In this way, merchant efforts associated managing e-mail messages and correspondence with customers may be effected without additional merchant efforts.

Thus, as described above with regard to these alternative implementations, the present application provides various ways of ensuring customer loyalty, such as in connection with store and item brands. Further, an integration of brick-and-mortar stores and online virtual stores is supported in accordance with the teachings herein.

During the course of using one or more software applications provided in accordance with the teachings herein, users generate information. For example, after a user scans a tag containing information representing measurements of a specific article of clothing, the consumer's personal information and the scanned size of the item may be transmitted to one or more computers, and the information may be sent to a vendor, manufacturer, distributor or other party associated with the clothing. This provides real-time information regarding sizes that are required, as well as other information, such as users' body measurement and preferences.

In certain circumstances, a particular article of clothing that fits a user may not be available. In such cases, suggestions may be provided for the user. Additionally, and as described herein, in case a correctly fitting article of clothing is not available in a particular location where a user is present, location-based suggestions may be provided where the correct fitting clothing article can be found. This option is suitable for locating clothing locally in a nearby store, even if the store would be considered a competitor of the store where the user is located. In some implementations, a brick-and-mortar store may prefer (or even insist) that no recommendations to competitor stores be provided. In such cases, only a single store brand may be permitted for recommendations. Alternatively, some distributors, designers, manufacturers or the like, may prefer that recommendations be provided for any store location, preferably one that is in very close proximity, where an article of clothing may be located.

In addition to recommendations made in connection with brick-and-mortar stores, recommendations may be made for on-line, virtual stores. For example, a customer may locate an article of clothing that fits well, but the website that the customer is visiting indicates that the store is out of stock. A recommendation may be immediately made for another website (including a link to that site) where the customer can purchase the article of clothing. The website may belong to the same brand retailer, or may be a competitor's.

In one or more implementations, an Internet website virtual clothing shop interacts directly with a CS database. After users log in, they can choose if they want to shop for themselves (default) or somebody else. The present application obviates the concern of choosing the correct fit (and style) for another person. Users are presented with items that fit the target person perfectly, making the shopping experience a very pleasant and satisfactory one.

Thus, as shown and described herein, the present application regards a new and convenient system for clothing purchase. For example, the present application provides for a one-scan process that provides a previously unrealized convenience for clothes shoppers and that provides a great assurance of fit accuracy. Further, the present application supports use of real, worldwide consistent physical size measurements, driven at least in part as a function of a matching algorithm that receives PS and CS information 104 for input. Moreover, the present application supports a seamless and adaptive acquisition of users' measurements that provides users with the freedom and flexibility to start with only a few, simple measurements, and then have the option to provide more detailed measurements at any point in the future in order to increase the quality of the service. The present application also supports location-based services, which may include GPS technology for locating alternative stores and locations for obtaining an article of clothing. Additionally, the present application supports multiple profiles, and offers the ability to shop for other people, and manage and share size information for various other users. In addition, the present application supports an integrated, real-time feedback loop, which provides valuable updated, current and regularly providing sources of data. These and other features are provided in connection with analytics, including to automatically process, aggregate and/or prepare data for the fashion designers and manufacturers, as well as for providing feedback.

The present application is useful for various markets and countries, for example, to provide consistency and clarity among the various size jargon currently in place in various stores and countries. For example, the present application translates size categories such as "infant," "toddler," "boys," "girls," "girls plus," "pre-teen for girls," "young junior," "slim" and "husky," which may be further organized by gender. Other size and style categories include, for example, tailored (suits, sports coats, evening) furnishings, sportswear, activewear, sportswear, uniforms and workwear. Such categories of style and clothing may carry their own respective size information that is made clear, consistent and understandable for customers is a function of the present application.

The present application may provide these at least in part as a function of machine-readable codes, such as QR codes, that encode the relevant size information for consumers in convenient and "local" ways. Moreover, one or more mobile applications may be provided for users to implement and enjoy a "one scan" solution, substantially as shown and described herein. This provides supports for "offline" shopping, in case no online Internet connection or bandwidth is available. Alternatively (or in addition), in the event that bandwidth is available, the present application supports use of machine readable codes, such as provided over the Internet and on-line. The present application further requires few if any fundamental IT changes for brick-and-mortar stores and for on-line shops, and offers therefore a very low barrier for adoption.

The present application does not standardize fashion, per se, nor are designers limited by the present application. Artistic freedom, both for designers and wearers alike, is preserved and left undisturbed by the present application. The present application works within those boundaries, and enables customers to determine whether the respective sizes set forth by designers will fit and look good on them.

The present application provides benefits for both customers and merchants. For customers, the present application improves the shopping experience. In brick-and-mortar stores, customers find the right clothing size faster and unnecessary try-ons in the dressing rooms are avoided. In online stores, customers order the right item size.

The present application alleviates a need for consumers to invest a considerable amount of time to find correct clothing sizes and prevents a frustrating customer experience. Customers are encouraged to purchase certain items they are interested in, and can purchase items, even in an on-line environment, with an assurance that the items will fit correctly and according to individual style preferences. The present application bridges the gap between the real- and virtual world by combining the benefits of both worlds, both from a consumer's and retailer's perspective.

FIG. 21 is flowchart that illustrates steps associated with an implementation of the present application. As noted herein, the present application supports or otherwise provides a software application. At step S102, a software application providing features shown and described here is downloaded free of charge. At step S104, profile information is entered via controls and options provided by a computing device configured with the software application. For example, PS information 108 is entered representing body measurements and style preferences. At step S106, a user scans a code associated with an article of clothing. For example, the code may be printed on a label attached to a garment, or a virtual representation of the code may be provided, such as on an Internet web site. Thereafter, at step S108, fit information regarding the clothing is displayed. For example, an analysis occurs to determine if, and how well the respective article of clothing fits, and the results are provided. At step S110, a decision is made whether to scan a code associated with another piece of clothing. If so, then the process branches back to step S106, and the user scans the next code. In one or more implementations there is no need to press any buttons in the software application, the code is substantially automatically scanned and read. In this way, the present application functions to keep the size-check as simple and fast as possible. Moreover, in one or more implementations, users may further get detailed feedback about a precise fit, while information most relevant for consumers may be shown directly on the scan screen. Further, a fitting score may be provided (e.g., a percentage value or other numeric representation) that indicates how well a piece of clothing fits, as is a direct suggestion of which of the scanned product fits the user best. In this way, users are directed to correct size, without having them to search through the whole stack of products. In one or more implementations, the percentage (or other) value is below a threshold value than the clothing will be determined to not fit suitably. Alternatively, if the percentage is above a threshold value, then the clothing may be determined to fit suitably.

Continuing with the flowchart shown in FIG. 21, after the user has finished scanning codes, the process continues to step S112, and a determination is made whether an offer, such as a discount, is available for the respective article(s) of clothing. If, then the process branches to step S114 and offer information is obtained and, thereafter, at step S116 a code representing the offer is presented, such as for scanning during the check out process. Thereafter, or in case there is no offer information, the process branches to step S118 and the check-out process occurs and the offer, if any, is applied.

Thus, as shown and described in connection with the example steps set forth in FIG. 21, functionality associated with the present application is easily and conveniently provided. In case a customer desires more information about a product (e.g., about where the item was manufactured) she is directly forwarded to the according product's web page on the mobile browser. In this way, present product information that is generated and curated for web shops (such as high quality product images, user comments, list of similar products, etc.) can be capitalized in traditional brick-and-mortar stores, as well.

Additional features and functionality provided by the present application is further described, below.

In one or more implementation, a "fitting feedback loop" may be included that enables users to report how well garments that they have worn actually fit. It is possible that incorrect information may be provided or stored in one or more databases, thereby causing an incorrect recommendation to be made. Alternatively, a person's body type may change, which would require updating information. By providing the user an option for giving feedback, for example, within a mobile software application, information associated with particular products that have high variations may be stored and used to improve upon the teachings herein. For example, a user scans a particular pair of blue jeans and a determination is made that the best fitting size is a 32" waist and a 34" length. After trying on those pants, the user discovers that the waist is too tight. Thereafter, the user may provide feedback and, based thereon and/or in connection with other feedback reports, a suggestion may be made that the user try a pair of pants having the same size but of a different brand or style, or a suggestion may be made to try a different size, such as a 33" waist. In this way, the present application improves and becomes more accurate over time. As used herein, the fitting feedback loop is different from the real-time feedback loop, described herein. The fitting feedback loop solves a potential issue associated with fitting.

Moreover, a customer may register and be provided with a "loyalty" or "membership" card to a particular store, which provides the customer with discounts and other benefits. In accordance with an implementation, customer PS size information may be stored in one or more databases accessible by the store. As the customer purchases items, the customer's membership card may be scanned at the register. As particular articles of clothing that the customer chose for purchase are also scanned at the register, a determination may be made by the store that one or more items may not fit properly. In response, the customer may be alerted that one or more items do not fit, and alternative articles may be suggested for the customer. Further, suggestions for different types of clothing may be provided at the time of checkout, which may lead to further sales for the store (e.g., so-called impulse purchases). Moreover, as a customer's body size changes over time, such as by gaining or losing weight, having a baby or the like, a store may have obsolete information regarding the PS information 108. This may be determined as particular items of clothing that a customer is purchasing are determined to be ones that do not fit well. In such cases the customer may be prompted to upload updated PS information 108 to a store's database.

In one or more implementations, rewards are provided for users of the present application. Beyond traditional coupons that are offered for the mere purchase of goods, the present application rewards users with discounts, coupons or other offers for use and compliance with one or more conditions. Users may be rewarded, for example, for determining that an item fits correctly prior to purchasing the item, which lowers the likelihood of the item being returned to merchants.

In one or more implementations, a proprietor of the present application may contribute to the cost associated with coupons, discounts or rebates. For example, a percentage of a rebate or discount may be remunerated to a manufacturer, retailer, distributor or other party associated with the sale of an article of clothing, by the proprietor. In such cases, information associated with purchases, returns, discounts, coupons and redemptions is received and stored for calculating appropriate payments that may be due. This provides an incentive to manufacturers, distributors, retailers or the like to avail themselves of the benefits of the present application, without bearing all off the costs associated with promotions, discounts or the like.

Moreover, users of the present application may be specifically targeted with advertisements. For example, after a person scans an item, a message may be sent via e-mail, SMS text or other suitable format offering the user a discount or other benefit for purchasing the item. In one or more implementations, a user is not specifically targeted until the user scans the same item a number of times (e.g., three separate times) or over a period of time (e.g. one scan per day). In such case, a user may be offered a specially discounted price if the user acts in a timely way and purchases the item within a short period of time (e.g., within the next two hours). For example, a user scans a dress at a clothing store and determines in accordance with the teachings herein that the dress is a perfect fit, and conforms well to the user's personal preferences. The user delays purchasing, however, due to the price of the dress. A week later, the same user returns to the store and scans the dress again to be sure that the dress fits well. Once again, however, the user delays purchasing the dress on account of the expense. Finally, the user scans the dress again during the following week and again decides against purchasing the dress. Shortly thereafter, an e-mail message is generated and transmitted to the user that contains a discount offer, such as "if you buy the dress within the next 2 hours, you'll get 15% off the purchase price." Thereafter, the user purchases the dress.

Thus, the present application may include operability to track a number of times that a user scans an item or otherwise inquires about a specific item. A reference value may be stored that, when met or exceeded by the number of times that an item is scanned, causes a message to be generated and sent to a user. The message may include an offer of a discount or other reward if the user acts within a period of time to purchase the item.

In one or more alternative implementations, users are offered rewards, such as discounts, coupons, rebates, free items or other benefits, immediately upon initially scanning an item in accordance with the present application. In such cases, a message may be generated and transmitted to the user shortly after an item is scanned for the first time by the user, which may offer a discount or other reward if the user purchases the item within a fixed amount of time, or if the user purchases the item before scanning the item two or three more times in the future. In this case, users may be informed that discounts for items that are scanned twice are available, but not for items that are scanned three times or more. This provides an incentive for users to make purchases shortly after scanning an item, or provides a disincentive for users who scan items repeatedly without making a purchase.

In yet one or more alternative implementations, users are rewarded for not returning items that were purchased in accordance with the teachings herein. For example, a user identifies an item on a web site that the user determines will fit well and is in compliance with the user's personal preferences. Recognizing that the item will fit the user well, the user orders the item. During or after the purchase, the user may receive a message that alerts the user of an offer rewarding the user for not returning the item in the future. The offer may be a discount on the cost of another item purchased in the future, a rebate that may be redeemed for value, or some other reward. In this way, users are rewarded in advance for ordering items that fit well and that are not returned to merchants in the future.

Thus, in one or more implementations, the date when an item is purchased is tracked and future activity relating to product returns is monitored. If, after a predetermined amount of time from the purchase date, an item is not returned, then the reward that was offered to a user may be redeemed by the user.

Although many of the implementations of the present application set forth herein regard use of clothing measurements from one or more manufacturers, other implementations are provided. The present application may operate to provide much of the functionality shown and described herein even in cases where data are note provided from manufacturers. In such cases, clothing measurement and size information associated with one or more manufacturers may be determined in various ways, such as using features and data gathered as described herein. Using data, for example, relating to purchases, returns, coupons, promotions and/or feedback that may be obtained from users, retailers, distributors, manufacturers or other parties, clothing size and measurement information may be deduced and stored in one or more databases. In this way, clothing size and measurement information obtained from one or more manufacturers may not be strictly required in order for providing the functionality described and set forth herein.

In one example implementation, information relating to product returns is used as a basis for determining clothing size and measurement information associated with one or more manufacturers. For example, a person is considering purchasing an article of clothing and identifies the article, such as by scanning a barcode, entering a SKU number or the like. In this example, size and measurement information from the particular manufacturer is not available. In such case, a search may be made to determine whether the particular article of clothing or a similar article of clothing had been previously purchased by this user or a different user. If so and it is determined that such article had not been returned, a conclusion may be drawn that the article of clothing fits this user appropriately. Measurement information associated with the user who previously purchased the article of clothing, as well as other articles of clothing purchased by the other user, may be used as a basis to deduct the size and measurement information associated with the particular article of clothing under consideration.

In cases where manufacturer clothing size and measurement information is not available, therefore, the present application may be configured to infer size and fit information using consumer data, such as relating to purchases, returns and promotions associated with one or more users. Other information may be used as well, such as provided by retailers, coupon/promotion companies or other information sources that have records relating to clothing purchases and returns. By tracking product returns, coupon redemptions, user feedback, purchase history or other clothing-related information, the present application may infer clothing size and fit information. For example, the present application identifies a purchase of an article of clothing from a particular merchant that is being considered for purchase. If the article was not returned, the system may infer the type and the likelihood of fit for the user who previously purchased the article. Moreover, an inference may be made for respective users having similar or virtually the same body types and measurements, that articles of clothing will fit others. In other cases, users with partial similarities, such as similar arm lengths and leg lengths but different chest and waist sizes, may still be suitable for inferring proper fits based upon at least the respective similarities.

Thus, the present application does not rely exclusively on data received from respective manufactures in order to provide the functionality set forth herein. Size and measurement information may be inferred using, for example, other users shopping behavior as a reference.

The reception of new data may also trigger recommendations for particular articles of clothing that the store would otherwise not have made. For example, after a woman loses 20 pounds, a cashier at checkout may recommend that the customer purchase a special dress that had just gone on sale at 50% reduced price. Such a recommendation may not have been possible without updated PS values being submitted and/or accessed by the store. In addition, by accessing PS values, such as via a scanning or by correlation with a customer's membership card information, customers may be provided with priorities to newly arrived clothing articles, such as in connection with a new line of clothing or for a new season.

In an alternative embodiment supporting purchasing online, a QR code containing the CS information 104 may be displayed, such as next to a picture of the clothing. This allows a consumer to check whether an item fits her, before placing an order for the clothing.

Services associated with the present application may be integrated with existing online shops in various ways. One way, for example, comprises the attachment of a QR code to the product description, or a small pop-up showing this code after selecting a special button. Users scan this code using the software application just as they would with a physical label. From a merchant's perspective this version has the big advantage that virtually no or only minor changes to the web shop system are required. From a consumer's perspective, this simple integration has the advantage that they can see if an item will fit them or their friends, without having to maintain online-accounts with each shop and without having to give out their measurements.

In an alternative implementation, a deeper integration into the web shop software may be provided with advanced features. For example, search functionality enabling customers to directly search the online shop for clothes that fit them or their friends is provided. The present application web service basically provides a fitting service for a specific piece of clothing and a person.

Thus, as can be appreciated in accordance with the present application the gap between retail and online is bridged using mobile devices and to boost the profitability of brands, retail stores, and online shops. Integration of retail and online stores increases product availability and range for consumers. Delivery choices for consumers, include online-to-home delivery, online-to-store pick-up, store-to-home delivery, real-time feedback loop. Personalized, direct communication channel to consumers when they make their purchasing decisions in retail stores.

The present application enables users to find the perfect fit immediately (save time while shopping and avoid long queues in front of dressing rooms). Additionally, customers enjoy risk-free online shopping (e.g., they shop with the confidence of ordering the correct size and without giving away personal data). Customers can shop for friends and family member (and be sure to pick the right size). Benefit from additional services (such as relevant product recommendations) the present application increases the sales and reduces the costs of merchants by offering them the following: optimize processes and increase customer satisfaction in brick-and-mortar stores (shorter lines before dressing rooms and reduced demand on shopping assistants). Customers can enjoy a direct, personalized communication channel via the software application, and be contacted at suitable times, such as when a customer is standing in a store holding a product and considering purchasing. Moreover, the number of returns, particularly for online retailers, is significantly reduced as a function of the present application.

The present application supports the use of accurate, worldwide and consistent physical size measurements. Instead of using pre-categorized shapes and measurements of clothing that are often inconsistent and misleading and, thereafter, storing codes representing the specific categories of clothing, the present application directly stores relevant, accurate physical measurements of clothing. In one or more implementations, such physical measurements may be converted for use in virtually every measuring system in use in the fashion industry, and usable by the various designers and brands.

As noted herein, the present application is advantageous over known systems by providing usability not only while a consumer is sitting at home in front of a computer, but also while the user is "on the go" and shopping in the real world. In one or more implementations, the present application provides location-based services. For example, in case a particular article of clothing does not fit a person and is not available in a particular brick-and-mortar store where a consumer is shopping, the present application supports identifying where the clothing article that fits correctly is available in a shop nearby. In one or more implementations, GPS technology is used to identify locations where particular clothing articles can be found.

As shown and described herein, the present application may provide a machine-readable code, such as a QR code, coupled with an article of clothing. The code may be printed directly on a tag or may be printed on the article of clothing itself. This code enables the shopper to scan on the fly and be informed immediately whether the clothing fits or not. By use of a single, one-scan sizing, which may not require any click at all, the present application enables user to use a smartphone or other suitable mobile computing device to determine with an extremely high degree of accuracy the fit/size of clothing. This may include cases where no Internet or other network connectivity is available (such as in a cellar or in remote areas with no bandwidth) by providing information in a machine-readable code and storing information locally on the mobile device. This may further include cases where Internet connectivity is available and remote access to data is supported.

Although illustrated embodiments of the present invention have been shown and described, it should be understood that various changes, substitutions, and alterations can be made by one of ordinary skill in the art without departing from the scope of the present invention.

What is claimed:

1. A computer-implemented method, comprising:
   providing a software application to execute on a respective computing device operated by a user, wherein the respective computing device is configured with a camera and is configured by the software application to:
   obtain user profile information representing at least respective physical body measurements and clothing fit preferences of each of a plurality of people,
   store on the respective computing device at least some of the user profile information representing the physical body measurements respectively associated with at least one of the people;
   automatically cause the camera to take an image;
   automatically extract, from the image, clothing information representing at least one respective article of clothing; and
   automatically transmit the extracted clothing information, using a first data communication protocol on a network, to at least one processor;

in response to receiving, by the at least one processor from the respective computing device using a first data communication protocol on the network, i) first user profile information respectively associated with one person, wherein none of the received first user profile information includes physical body measurements, and ii) first clothing information respectively associated with a first article of clothing, transmitting by the at least one processor over the network to a computing device associated with the respective article of clothing, information representing the article of clothing;

receiving, by the at least one processor over the network from a different computing device associated with the article of clothing, clothing article size information representing at least one measurement of the first article of clothing;

accessing, by the at least one processor, a respective one reference body model of a plurality of stored reference body models, each of which correspond with respective ones of various clothing sizes, wherein the respective one reference body model corresponds with the clothing article size information;

transmitting, by the at least one processor to the respective computing devices, the clothing article size information and information representing the one reference body model;

wherein the respective computing device is further configured by the software application to:

automatically correlate the received clothing article size information and the stored physical body measurements represented in the first user profile information;

automatically display, as a function of the step of correlating, a comparison that includes:

a graphical representation of the respective one reference body model; and a graphical representation of the first user's body, wherein the comparison is based at least in part on the clothing fit preferences of the one person.

2. The method of claim 1, wherein correlating the received information further comprises converting at least some of the received clothing article size information from a first standard to a second standard.

3. The method of claim 1, further comprising:

providing, by at least one processor, an application programming interface and wherein the information is received via the application programming interface.

4. The method of claim 1, further comprising:

generating a fit score representing a degree by which the first article of clothing matches at least body measurements and clothing fit preferences, wherein the first article of clothing matches at least the body measurements and clothing fit preferences when the value is above a threshold value.

5. The method of claim 4, wherein the software application configures the computing devices to display the fit score in a graphical user interface as a graphical representation of a human form and an article of clothing.

6. The method of claim 5, wherein the representation identifies respective areas on a human body where the article of clothing does not fit.

7. The method of claim 1, further comprising accessing, by at least one processor, information associated with a discounted price of the first article of clothing and transmitting, by the at least one processor to the one of the plurality of configured computing devices, a message representing the discounting price.

8. The method of claim 1, further comprising:

determining, by at least one processor, a recommendation for purchasing the first article of clothing from at least one merchant; and transmitting the recommendation to the one of the plurality of configured computing devices.

9. The method of claim 8, wherein the recommendation further includes displaying a map that shows where the at least one merchant is located.

10. The method of claim 1, wherein the software application includes a graphical user interface and receiving at least some of the profile information is received via the graphical user interface.

11. The method of claim 1, further comprising reading a machine-readable code to access clothing information associated with the article of clothing.

12. The method of claim 11, wherein the machine readable code is displayed on a computing device.

13. The method of claim 1, further wherein when the software application executes, each of the respective computing devices is configured to:

transmit, to at least one computing device associated with the article of clothing, at least feedback information associated with the first article of clothing.

14. A computer-implemented system that uses electronic information stored on remotely located devices to generate and transmit information to a respective computing device over a network, the system comprising:

a software application that executes on each of a plurality of computing devices respectively operated by each of a plurality of users, wherein each of the plurality of computing devices is configured with a camera and the software application;

wherein, when the software application executes on a respective one of the computing devices, the respective computing device is configured to obtain user profile information representing at least respective physical body measurements and clothing fit preferences of each of a plurality of people, and to store on the respective computing device at least some of the user profile information representing the physical body measurements;

further wherein, when the software application executes, the respective computing device is configured to:

automatically cause the camera to take an image;

automatically extract, from the image, clothing information representing at least one respective article of clothing; and automatically transmit the extracted clothing information, using a first data communication protocol on the network;

at least one processor configured to interact with a computer-readable medium in order to perform operations comprising:

in response to receiving, from one of the plurality of configured computing devices using a first data communication protocol on the network, i) first user profile information respectively associated with one person, wherein none of the received first user profile information includes physical body measurements, and ii) first clothing information respectively associated with a first article of clothing, transmitting over the network to a computing device associated with the respective article of clothing, information representing the article of clothing;

receiving, over the network from a different computing device associated with the article of clothing, clothing article size information representing at least one measurement of the first article of clothing;

accessing a respective one reference body model of a plurality of stored reference body models, each of which correspond with respective ones of various clothing sizes, wherein the respective one reference body model corresponds with the clothing article size information;

transmitting, by the at least one processor to the one of the plurality of configured computing devices, the clothing article size information and information representing the one reference body model;

further wherein when the software application executes, the respective computing device is configured to:

automatically correlate the received clothing article size information and the stored physical body measurements represented in the first user profile information;

automatically display, as a function of the step of correlating, a comparison of that includes:
 a graphical representation of the respective one reference body model; and
 a graphical representation of the first user's body,
 wherein the comparison is based at least in part on the clothing fit preferences of the one person.

15. The system of claim 14, wherein correlating the received information further comprises converting at least some of the received clothing article size information from a first standard to a second standard.

16. The system of claim 14, wherein the processor readable media have instructions for causing the following step further to be performed by at least one processor:
 provide an application programming interface, and wherein the information is received via the application programming interface.

17. The system of claim 14, wherein the at least one processor is further configured to interact with a computer-readable medium in order to perform operations comprising:
 generating a fit score representing a degree by which the first article of clothing matches at least body measurements and clothing fit preferences, wherein the first article of clothing matches at least the body measurements and clothing fit preferences when the value is above a threshold value.

18. The system of claim 17, wherein the software application configures the computing devices to display the fit score in a graphical user interface as a graphical representation of a human form and an article of clothing.

19. The system of claim 18, wherein the representation identifies respective areas on a human body where the article of clothing does not fit.

20. The system of claim 14, wherein the processor readable media have instructions for causing the following steps further to be performed by at least one processor:
 access information associated with a discount of the first article of clothing; and
 transmit to the one of the plurality of configured computing devices, a message representing the discounting price.

21. The system of claim 14, wherein the processor readable media have instructions for causing the following steps further to be performed by at least one processor:
 determine a recommendation for purchasing the first article of clothing from at least one merchant; and
 transmit the recommendation to the at least one of the plurality of configured computing devices.

22. The system of claim 21, wherein the recommendation further includes displaying a map that shows where the at least one merchant is located.

23. The system of claim 14, wherein software application includes a graphical user interface and at least some of the personal profile information is received via the graphical user interface.

24. The system of claim 14, wherein the machine readable code is displayed on a computing device.

25. The system of claim 14, further wherein when the software application executes, each of the respective computing devices is configured to:
 transmit, to at least one computing device associated with the article of clothing, at least feedback information associated with the first article of clothing.

* * * * *